US012357138B2

(12) United States Patent
Benson, Jr. et al.

(10) Patent No.: US 12,357,138 B2
(45) Date of Patent: Jul. 15, 2025

(54) CLEANING PAD ASSEMBLY FOR MOBILE ROBOT

(71) Applicant: iRobot Corporation, Bedford, MA (US)

(72) Inventors: Brian Cleve Benson, Jr., Chelmsford, MA (US); Russell Walter Morin, Burlington, MA (US); Robert Sasena, Boston, MA (US)

(73) Assignee: iRobot Corporation, Bedford, MA (US)

( * ) Notice: Subject to any disclaimer, the term of this patent is extended or adjusted under 35 U.S.C. 154(b) by 421 days.

(21) Appl. No.: 17/837,676

(22) Filed: Jun. 10, 2022

(65) Prior Publication Data

US 2023/0397785 A1 Dec. 14, 2023

(51) Int. Cl.
| | |
|---|---|
| A47L 9/06 | (2006.01) |
| A47L 9/28 | (2006.01) |
| A47L 11/40 | (2006.01) |
| B32B 3/04 | (2006.01) |
| B32B 3/08 | (2006.01) |
| B32B 7/09 | (2019.01) |

(52) U.S. Cl.
CPC ........... *A47L 9/0673* (2013.01); *A47L 9/2805* (2013.01); *A47L 11/4036* (2013.01); *B32B 3/04* (2013.01); *B32B 3/085* (2013.01); *B32B 7/09* (2019.01); *A47L 2201/00* (2013.01); *B32B 2432/00* (2013.01)

(58) Field of Classification Search
CPC ...... A47L 2201/00; A47L 9/0673; A47L 9/06; A47L 9/2805; A47L 9/28; A47L 11/4036; A47L 11/40; A47L 13/16; A47L 2201/06; A47L 11/4011; A47L 13/42; A47L 13/44; B32B 3/04; B32B 3/085; B32B 3/08; B32B 7/09; B32B 2432/00
See application file for complete search history.

(56) References Cited

U.S. PATENT DOCUMENTS

| | | | |
|---|---|---|---|
| 9,265,396 B1 | 2/2016 | Lu et al. | |
| 10,292,553 B1 | 5/2019 | Ebrahimi Afrouzi et al. | |
| 2020/0345197 A1* | 11/2020 | Lucas | A47L 11/4038 |

FOREIGN PATENT DOCUMENTS

| | | |
|---|---|---|
| CN | 109222774 | 1/2019 |
| CN | 111839374 | 10/2020 |

OTHER PUBLICATIONS

"International Application Serial No. PCT US2023 023061, International Search Report mailed Aug. 25, 2023", 4 pgs.
(Continued)

*Primary Examiner* — Monica S Carter
*Assistant Examiner* — Kent N Shum
(74) *Attorney, Agent, or Firm* — Schwegman Lundberg & Woessner, P.A.

(57) ABSTRACT

A cleaning pad for a mobile cleaning robot can include a backing layer, a cleaning layer, and a card. The backing layer can be user-releasably securable to a pad tray of the mobile cleaning robot. The cleaning layer can be affixed to the backing layer and engageable with a floor surface. The card can be connected to at least one of the backing layer and the cleaning layer and can be engaged with the backing layer. The card can be slidably insertable into a retainer of the pad tray to align the cleaning pad with the pad tray of the mobile cleaning robot.

24 Claims, 17 Drawing Sheets

(56) References Cited

OTHER PUBLICATIONS

"International Application Serial No. PCT US2023 023061, Written Opinion mailed Aug. 25, 2023", 7 pgs.
"International Application Serial No. PCT/US2023/023061, International Preliminary Report on Patentability mailed Dec. 19, 2024", 9 pgs.

* cited by examiner

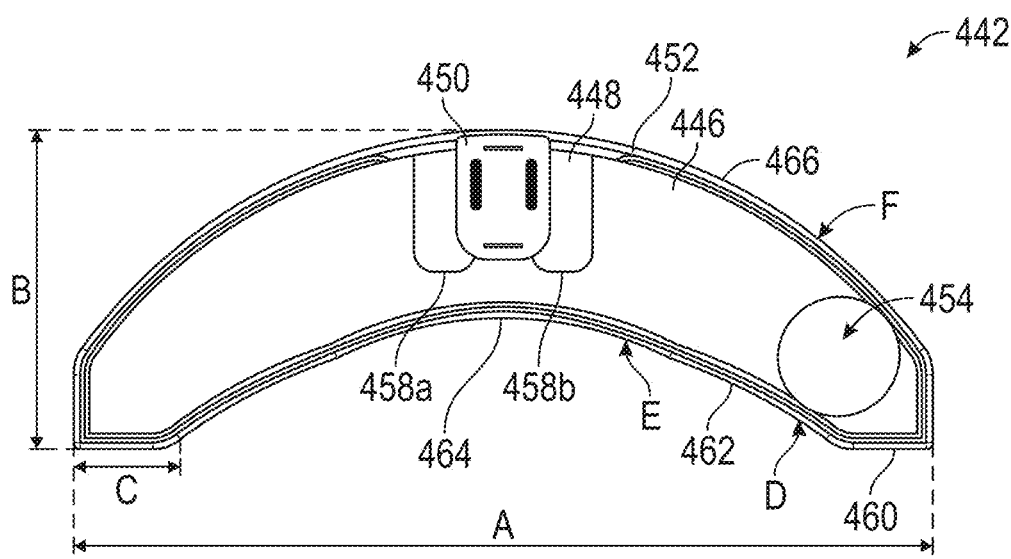
FIG. 5A
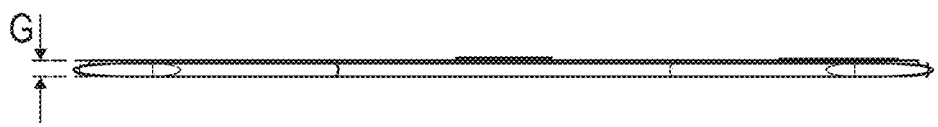
FIG. 5B
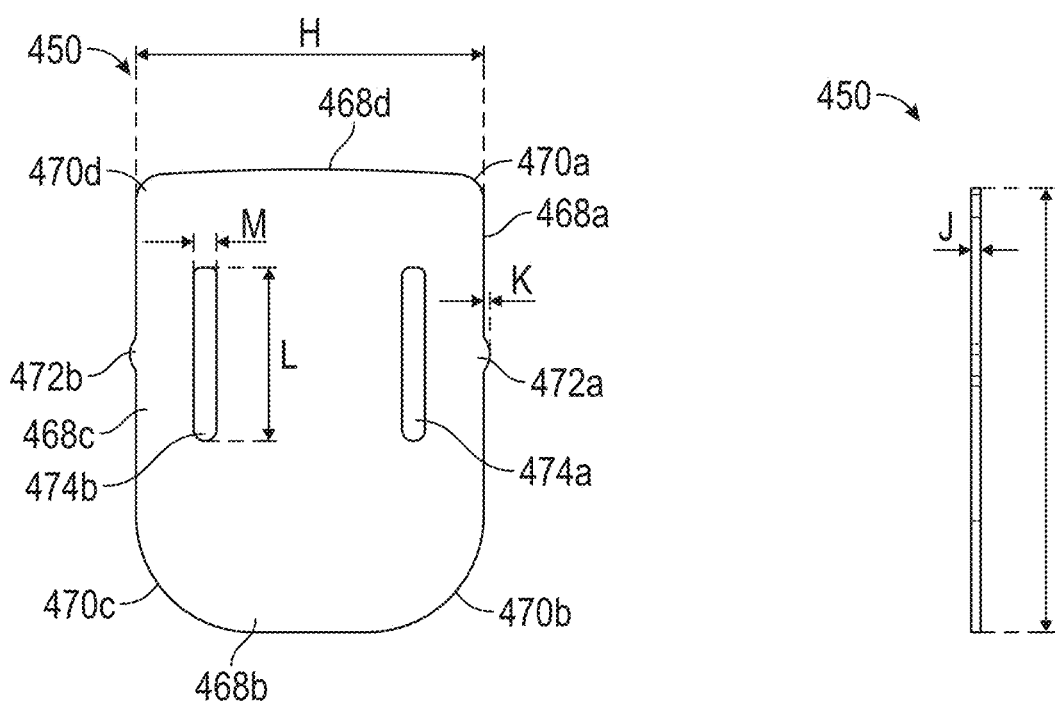
FIG. 6A
FIG. 6B

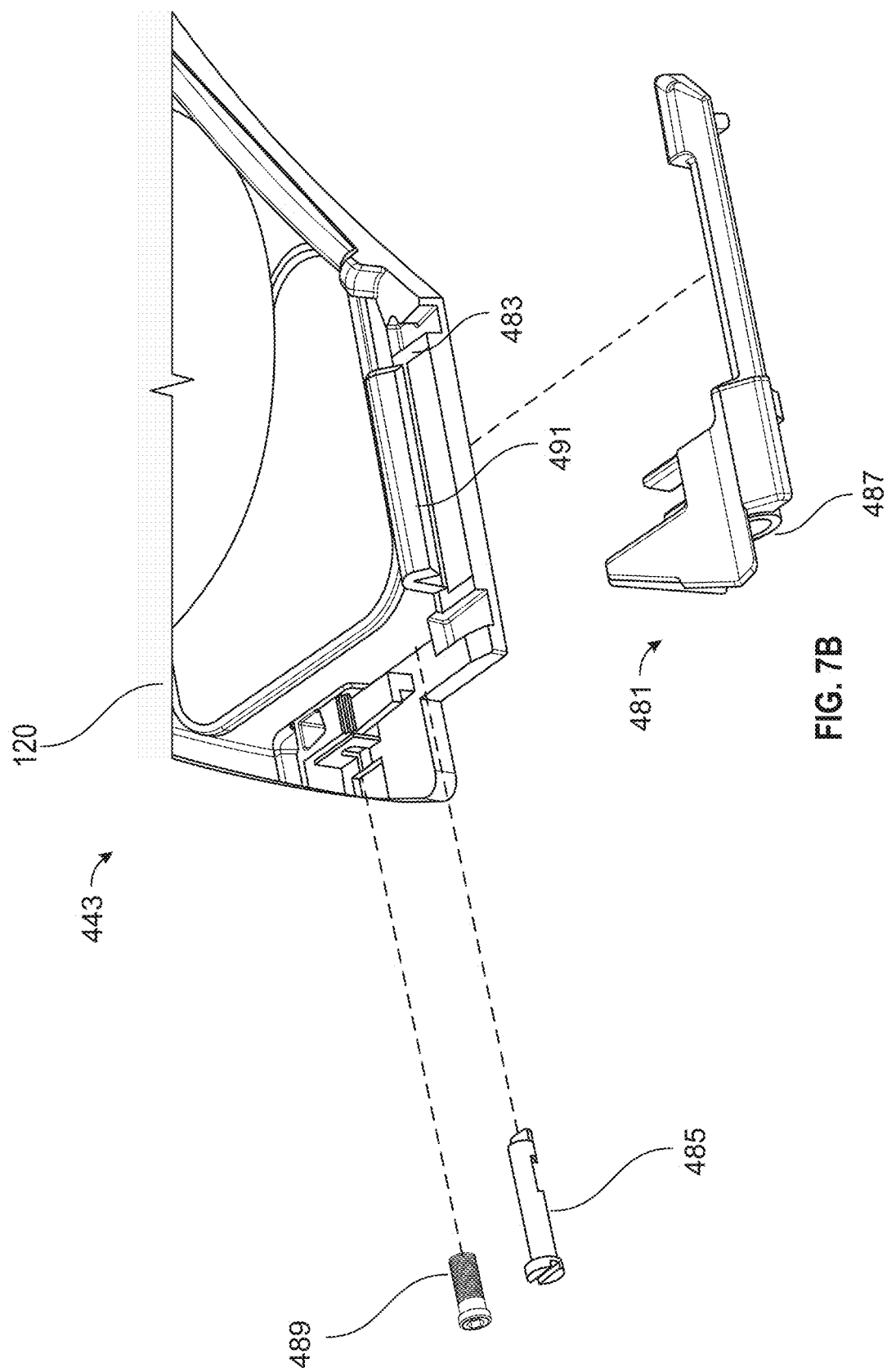

CLEANING PAD ASSEMBLY FOR MOBILE ROBOT

BACKGROUND

Autonomous mobile robots can move about an environment and can perform functions and operations in a variety of categories, including but not limited to security operations, infrastructure or maintenance operations, navigation or mapping operations, inventory management operations, and robot/human interaction operations. Some mobile robots, known as cleaning robots, can perform cleaning tasks autonomously within an environment, e.g., a home. Many kinds of cleaning robots are autonomous to some degree and in different ways. For example, a cleaning robot can conduct cleaning missions, where the robot traverses and simultaneously ingests (e.g., vacuums) debris from the floor surface of their environment.

SUMMARY

Some autonomous cleaning robots can include both a vacuum system and a mopping system that can allow the robots to perform both mopping and vacuuming operations (such as simultaneously or alternatively), often referred to as two-in-one robots or vacuums. Some two-in-one robots include a pad type mopping system located rearward of a vacuum extractor that allows the robot to extract debris from a floor surface just prior to mopping the surface with the pad. These systems can be effective for cleaning hard surfaces that may require both debris extraction and mopping. However, use of a pad type mopping system often requires that a mopping pad be replaced one or more times during a cleaning mission, depending on the size of the area to be cleaned and how dirty the area is. Pad changing can also occur after the mission is complete or before mission begins, such as to prepare the robot ready for the next mission. If the pad is not properly connected to the pad tray, the pad may become separated from the tray during cleaning missions.

This disclosure helps to address these issues by including features to ensure that the pad is properly aligned with and secured to the pad tray. For example, the pad can include a card that is secured to (e.g., slidably engages) the pad tray to secure the pad to the tray and align fasteners of the pad with fasteners of the tray. The tray can also include one or more fasteners to secure the pad to the pad tray. The card can optionally include features to align the card with a retainer of the tray and one or more features to help secure the card to the pad tray. The pad and tray together can also mate to form a relatively planar cleaning surface. That is, the tray can engage the pad in a uniform matter to help reduce hot spots (or higher pressure areas) on the cleaning pad, which can help improve product life and can help improve cleaning performance.

For example, a cleaning pad for a mobile cleaning robot can include a backing layer, a cleaning layer, and a card. The backing layer can be user-releasably securable to a pad tray of the mobile cleaning robot. The cleaning layer can be affixed to the backing layer and engageable with a floor surface. The card can be connected to at least one of the backing layer and the cleaning layer and can be engaged with the backing layer. The card can be slidably insertable into a retainer of the pad tray to align the pad with the tray and to help secure the cleaning pad to the pad tray of the mobile cleaning robot.

The above discussion is intended to provide an overview of subject matter of the present patent application. It is not intended to provide an exclusive or exhaustive explanation of the invention. The description below is included to provide further information about the present patent application.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

FIG. 5A illustrates a top view of a cleaning pad.

FIG. 5B illustrates a rear view of a cleaning pad.

FIG. 6A illustrates a top view of a portion of a cleaning pad.

FIG. 6B illustrates a side view of a portion of a cleaning pad.

FIG. 7B illustrates an isometric view of a portion of a pad tray.

DETAILED DESCRIPTION

Robot Operation Summary

Figure 1:
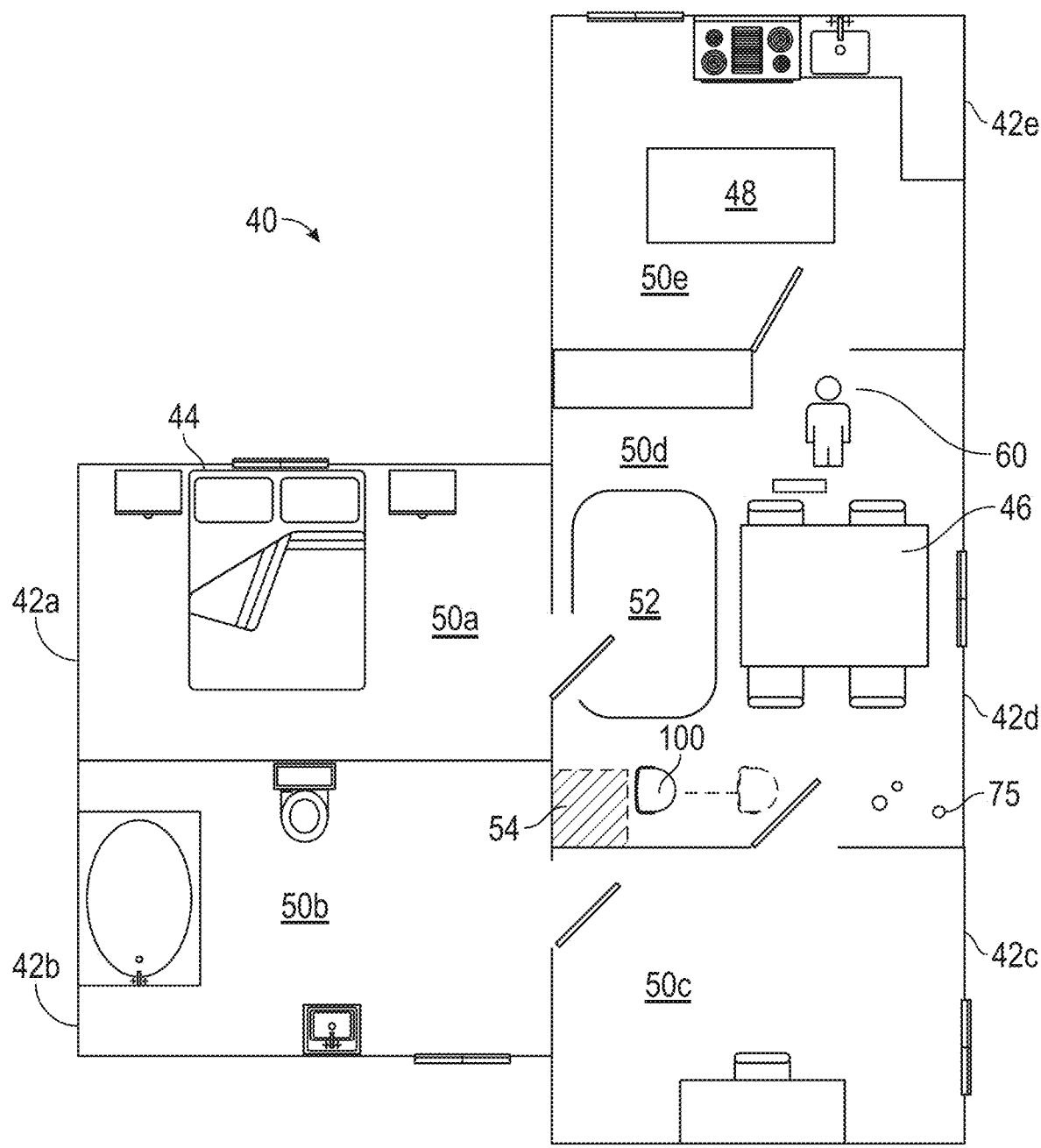
FIG. 1 illustrates a plan view of a mobile cleaning robot in an environment.

FIG. 1 illustrates a plan view of a mobile cleaning robot 100 in an environment 40, in accordance with at least one example of this disclosure. The environment 40 can be a dwelling, such as a home or an apartment, and can include rooms 42a-42e. Obstacles, such as a bed 44, a table 46, and an island 48 can be located in the rooms 42 of the environment. Each of the rooms 42a-42e can have a floor surface 50a-50e, respectively. Some rooms, such as the room 42d, can include a rug, such as a rug 52. The floor surfaces 50 can be of one or more types such as hardwood, ceramic, low-pile carpet, medium-pile carpet, long (or high)-pile carpet, stone, or the like.

The mobile cleaning robot 100 can be operated, such as by a user 60, to autonomously clean the environment 40 in a room-by-room fashion. In some examples, the robot 100 can clean the floor surface 50a of one room, such as the room 42a, before moving to the next room, such as the room 42d, to clean the surface of the room 42d. Different rooms can have different types of floor surfaces. For example, the room 42e (which can be a kitchen) can have a hard floor surface, such as wood or ceramic tile, and the room 42a (which can be a bedroom) can have a carpet surface, such as a medium pile carpet. Other rooms, such as the room 42d (which can be a dining room) can include multiple surfaces where the rug 52 is located within the room 42d.

During cleaning or traveling operations, the robot 100 can use data collected from various sensors (such as optical sensors) and calculations (such as odometry and obstacle detection) to develop a map of the environment 40. Once the map is created, the user 60 can define rooms or zones (such as the rooms 42) within the map. The map can be presentable to the user 60 on a user interface, such as a mobile device, where the user 60 can direct or change cleaning preferences, for example.

Also, during operation, the robot 100 can detect surface types within each of the rooms 42, which can be stored in the robot or another device. The robot 100 can update the map (or data related thereto) such as to include or account for surface types of the floor surfaces 50a-50e of each of the respective rooms 42 of the environment. In some examples, the map can be updated to show the different surface types such as within each of the rooms 42.

In some examples, the user 60 can define a behavior control zone 54 using, for example, the methods and systems described herein. In response to the user 60 defining the behavior control zone 54, the robot 100 can move toward the behavior control zone 54 to confirm the selection. After confirmation, autonomous operation of the robot 100 can be initiated. In autonomous operation, the robot 100 can initiate a behavior in response to being in or near the behavior control zone 54. For example, the user 60 can define an area of the environment 40 that is prone to becoming dirty to be the behavior control zone 54. In response, the robot 100 can initiate a focused cleaning behavior in which the robot 100 performs a focused cleaning of a portion of the floor surface 50d in the behavior control zone 54.

Robot Example

Figure 2A:
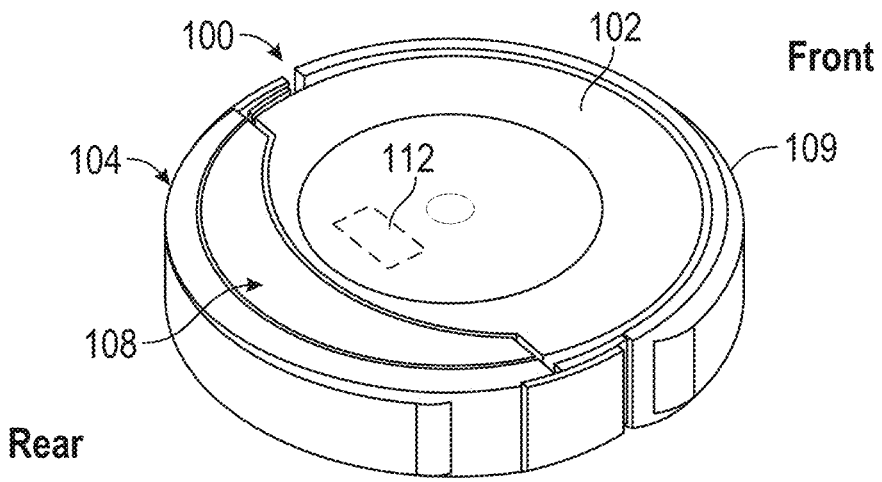
FIG. 2A illustrates an isometric view of a mobile cleaning robot in a first condition.
Figure 2B:
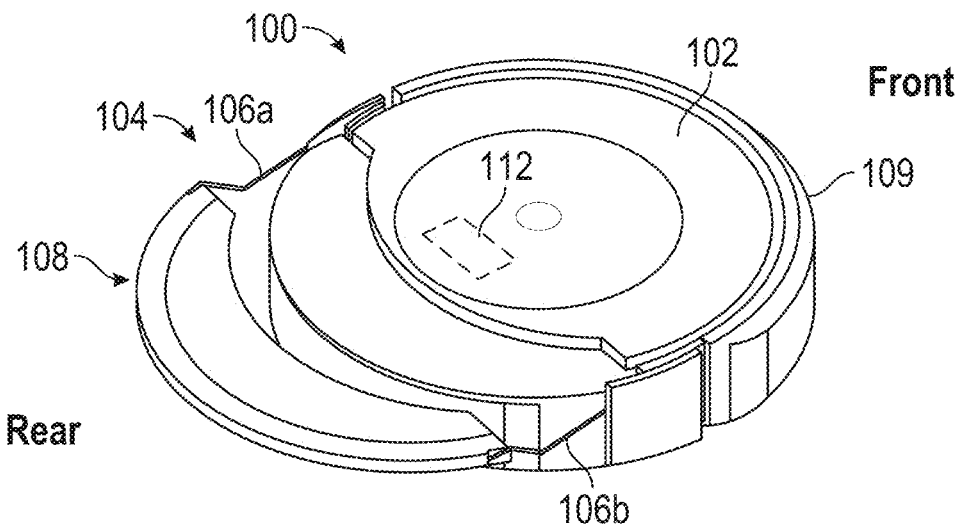
FIG. 2B illustrates an isometric view of a mobile cleaning robot in a second condition.
Figure 2C:
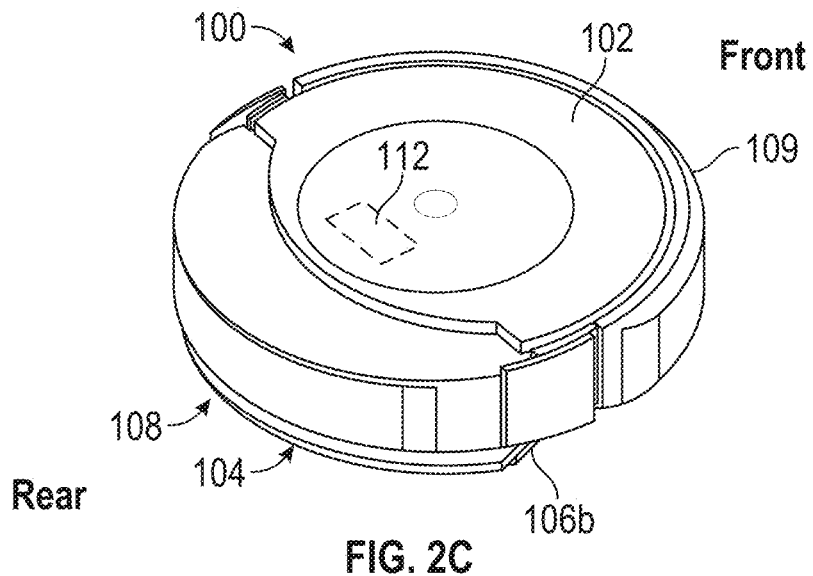
FIG. 2C illustrates an isometric view of a mobile cleaning robot in a third condition.

FIG. 2A illustrates an isometric view of a mobile cleaning robot 100 with a pad assembly in a stored position. FIG. 2B illustrates an isometric view of the mobile cleaning robot 100 with the pad assembly in an extended position. FIG. 2C illustrates an isometric view of the mobile cleaning robot 100 with the pad assembly in a mopping position. FIGS. 2A-2C also show orientation indicators Front and Rear. FIGS. 2A-2C are discussed together below.

The mobile cleaning robot 100 can include a body 102 and a mopping system 104. The mopping system 104 can include arms 106a and 106b (referred to together as arms 106) and a pad assembly 108. The robot 100 can also include a bumper 109 and other features such as an extractor (including rollers), one or more side brushes, a vacuum system, a controller, a drive system (e.g., motor, geartrain, and wheels), a caster, and sensors, as discussed in further detail below. A distal portion of the arms 106 can be connected to the pad assembly 108 and a proximal portion of the arms 106a and 106b can be connected to an internal drive system to drive the arms 106 to move the pad assembly 108.

Figure 2D:
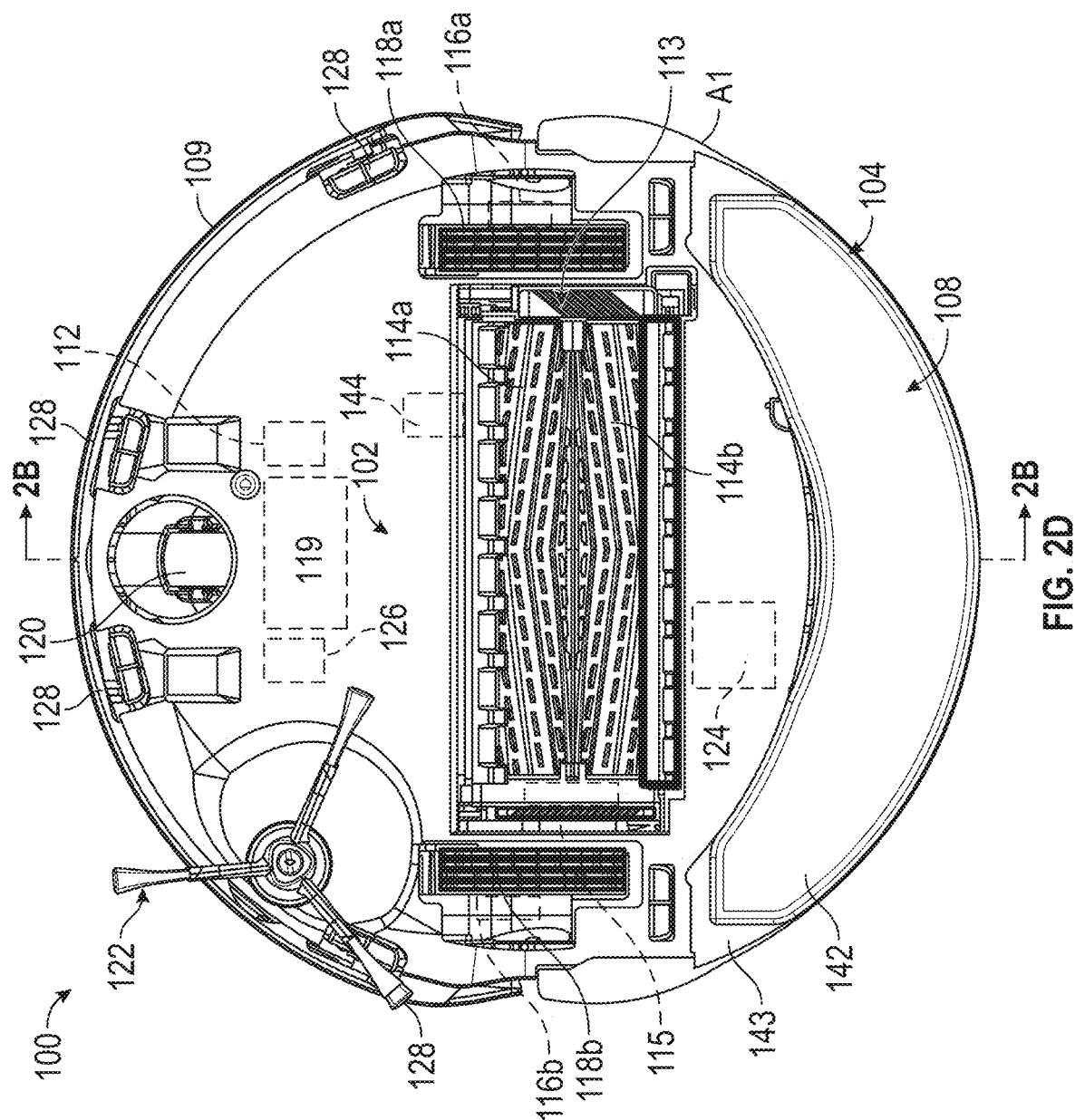
FIG. 2D illustrates a bottom view of a mobile cleaning robot in a third condition.
Figure 2E:
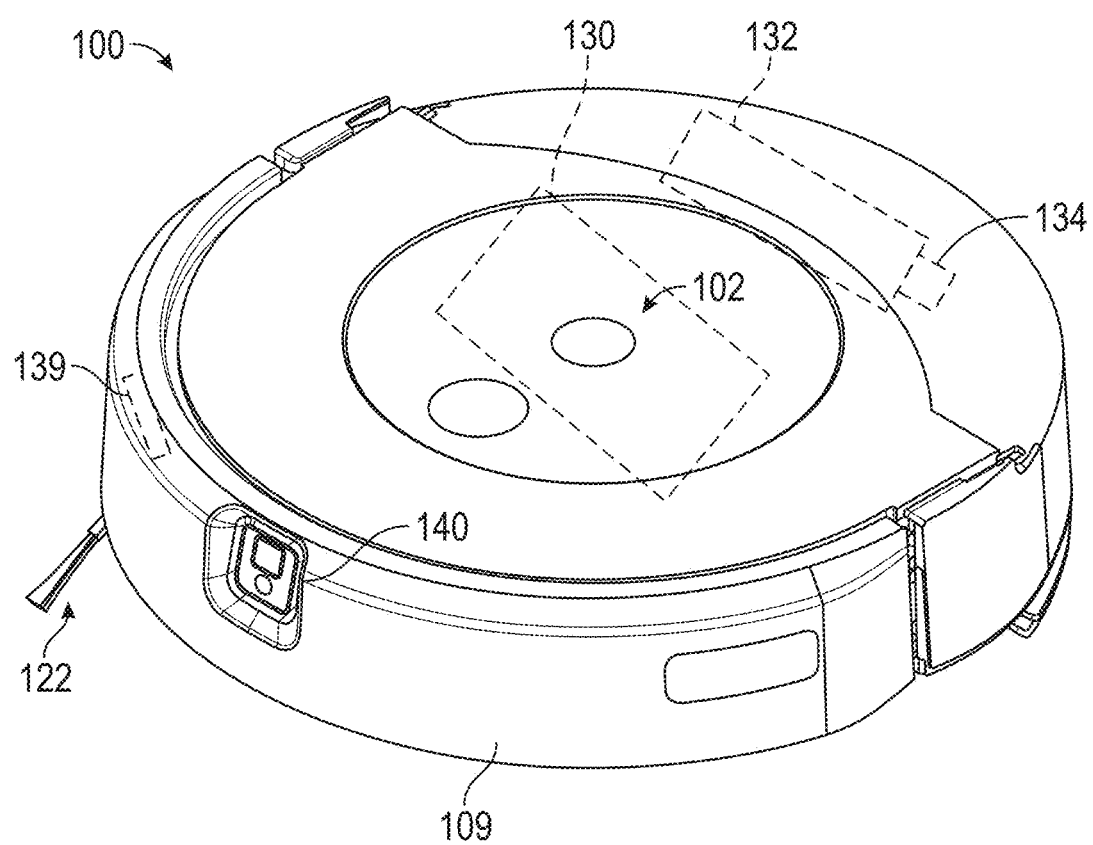
FIG. 2E illustrates a top isometric view of a mobile cleaning robot in a third condition.

FIGS. 2A-2C show how the robot 100 can be operated to move the pad assembly 108 from a stored position in FIG. 2A to a transition or partially deployed position in FIG. 2B, to a mopping or a deployed position in FIG. 2C. In the stored position of FIG. 2A, the robot 100 can perform only vacuuming operations. In the deployed position of FIG. 2C, the robot 100 can perform vacuuming operations or mopping operations. FIGS. 2D-2E discuss additional components of the robot 100.

Components of the Robot

FIG. 2D illustrates a bottom view of the mobile cleaning robot 100 and FIG. 2E illustrates a top isometric view of the robot 100. FIGS. 2D and 2E are discussed together below. The robot 100 of FIGS. 2D and 2E can be consistent with FIGS. 2A-2C; FIGS. 2D-2E show additional details of the robot 100 For example, FIGS. 2D-2E show that the robot 100 can include a body 102, a bumper 109, an extractor 113 (including rollers 114a and 114b), motors 116a and 116b, drive wheels 118a and 118b, a caster 120, a side brush assembly 122, a vacuum assembly 124, memory 126, sensors 128, and a debris bin 130. The mopping system 104 can also include a tank 132 and a pump 134.

The cleaning robot 100 can be an autonomous cleaning robot that autonomously traverses the floor surface 50 (of FIG. 1) while ingesting debris 75 from different parts of the floor surface 50. As shown in FIG. 2D, the robot 100 can include the body 102 that can be movable across the floor surface 50. The body 102 can include multiple connected structures to which movable or fixed components of the cleaning robot 100 are mounted. The connected structures can include, for example, an outer housing to cover internal components of the cleaning robot 100, a chassis to which the drive wheels 118a and 118b and the cleaning rollers 114a and 114b (of the cleaning assembly 113) are mounted, the bumper 109 mounted to the outer housing, etc. The caster wheel 120 can support a front portion of the body 102 above the floor surface 50, and the drive wheels 118a and 118b can support the middle and rear portions of the body 102 (but can also support a majority of the weight of the robot 100) above the floor surface 50.

As shown in FIG. 2D, the body 102 can include a front portion that has a substantially semicircular shape that can be connected to the bumper 109, and a rear portion that has a substantially semicircular shape. In other examples, the body 102 can have other shapes such as a square front or straight front. The robot 100 can also include a drive system including the actuators 116a and 116b, e.g., motors. The actuators 116a and 116b can be connected to the body 102 and can be operably connected to the drive wheels 118a and 118*b*, which can be rotatably mounted to the body 102. The actuators 116*a* and 116*b*, when driven, can rotate the drive wheels 118*a* and 118*b* to enable the robot 100 to autonomously move across the floor surface 50.

The vacuum assembly 124 can be carried within the body 102 of the robot 100, e.g., in a rear portion of the body 102, and can be located in other locations in other examples. The vacuum assembly 124 can include a motor to drive an impeller that generates the airflow when rotated. The airflow and the cleaning rollers 114, when rotated, can cooperate to ingest the debris into the robot 100. The cleaning bin 130 can be mounted in the body 102 and can contain the debris ingested by the robot 100. A filter in the body 102 can separate the debris from the airflow before the airflow enters the vacuum assembly 124 and is exhausted out of the body 102. In this regard, the debris can be captured in both the cleaning bin 130 and the filter before the airflow is exhausted from the body 102. In some examples, the vacuum assembly 124 and extractor 113 can be optionally included or can be of a different type.

The cleaning rollers 114*a* and 114*b* can be operably connected to an actuator 115, e.g., a motor, through a gearbox. The cleaning head 113 and the cleaning rollers 114*a* and 114*b* can be positioned forward of the cleaning bin 130. The cleaning rollers 114 can be mounted to an underside of the body 102 so that the cleaning rollers 114*a* and 114*b* engage debris on the floor surface 50 during the cleaning operation when the underside of the body 102 faces the floor surface 50.

The controller 112 can be located within the housing and can be a programable controller, such as a single or multi-board computer, a direct digital controller (DDC), a programable logic controller (PLC), or the like. In other examples, the controller 112 can be any computing device, such as a handheld computer, for example, a smart phone, a tablet, a laptop, a desktop computer, or any other computing device including a processor, memory, and communication capabilities. The memory 126 can be one or more types of memory, such as volatile or non-volatile memory, read-only memory (ROM), random-access memory (RAM), magnetic disk storage media, optical storage media, flash-memory devices, and other storage devices and media. The memory 126 can be located within the housing 102, connected to the controller 112 and accessible by the controller 112.

The controller 112 can operate the actuators 116*a* and 116*b* to autonomously navigate the robot 100 about the floor surface 50 during a cleaning operation. The actuators 116*a* and 116*b* can be operable to drive the robot 100 in a forward drive direction, in a backwards direction, and to turn the robot 100. The controller 112 can operate the vacuum assembly 124 to generate an airflow that flows through an air gap near the cleaning rollers 114, through the body 102, and out of the body 102.

The control system can further include a sensor system with one or more electrical sensors. The sensor system, as described herein, can generate a signal indicative of a current location of the robot 100, and can generate signals indicative of locations of the robot 100 as the robot 100 travels along the floor surface 50. The sensors 128 (shown in FIG. 2D) can be located along a bottom portion of the housing 102. Each of the sensors 128 can be an optical sensor that can be configured to detect a presence or absence of an object below the optical sensor, such as the floor surface 50. The sensors 128 (optionally cliff sensors) can be connected to the controller 112 and can be used by the controller 112 to navigate the robot 100 within the environment 40. In some examples, the cliff sensors can be used to detect a floor surface type which the controller 112 can use to selectively operate the mopping system 104.

The cleaning pad assembly 108 can be a cleaning pad connected to the bottom portion of the body 102 (or connected to a moving mechanism configured to move the assembly 108 between a stored position and a cleaning position), such as to the cleaning bin 130 in a location to the rear of the extractor 113. The tank 132 can be a water tank configured to store water or fluid, such as cleaning fluid, for delivery to a mopping pad 142. The pump 134 can be connected to the controller 112 and can be in fluid communication with the tank 132. The controller 112 can be configured to operate the pump 134 to deliver fluid to the mopping pad 142 during mopping operations. In some examples, the pad 142 can be a dry pad such as for dusting or dry debris removal. The pad 142 can also be any cloth, fabric, or the like configured for cleaning (either wet or dry) of a floor surface.

Operation of the Robot

In operation of some examples, the controller 112 can be used to instruct the robot 100 to perform a mission. In such a case, the controller 112 can operate the motors 116 to drive the drive wheels 118 and propel the robot 100 along the floor surface 50. The robot 100 can be propelled in a forward drive direction or a rearward drive direction. The robot 100 can also be propelled such that the robot 100 turns in place or turns while moving in the forward drive direction or the rearward drive direction. In addition, the controller 112 can operate the motors 115 to cause the rollers 114*a* and 114*b* to rotate, can operate the side brush assembly 122, and can operate the motor of the vacuum system 119 to generate airflow. The controller 112 can execute software stored on the memory 126 to cause the robot 100 to perform various navigational and cleaning behaviors by operating the various motors of the robot 100.

The various sensors of the robot 100 can be used to help the robot navigate and clean within the environment 40. For example, the cliff sensors can detect obstacles such as drop-offs and cliffs below portions of the robot 100 where the cliff sensors are disposed. The cliff sensors can transmit signals to the controller 112 so that the controller 112 can redirect the robot 100 based on signals from the sensors. Proximity sensors can produce a signal based on a presence or the absence of an object in front of the optical sensor. For example, detectable objects include obstacles such as furniture, walls, persons, and other objects in the environment 40 of the robot 100. The proximity sensors can transmit signals to the controller 112 so that the controller 112 can redirect the robot 100 based on signals from the proximity sensors. In some examples, a bump sensor can be used to detect movement of the bumper 109 along a fore-aft axis of the robot 100. A bump sensor 139 can also be used to detect movement of the bumper 109 along one or more sides of the robot 100 and can optionally detect vertical bumper movement. The bump sensors 139 can transmit signals to the controller 112 so that the controller 112 can redirect the robot 100 based on signals from the bump sensors 139.

The robot 100 can also optionally include one or more dirt sensors 144 connected to the body 102 and in communication with the controller 112. The dirt sensors 144 can be a microphone, piezoelectric sensor, optical sensor, or the like located in or near a flowpath of debris, such as near an opening of the cleaning rollers 114 or in one or more ducts within the body 102. This can allow the dirt sensor(s) 144 to detect how much dirt is being ingested by the vacuum assembly 124 (e.g., via the extractor 113) at any time during a cleaning mission. Because the robot 100 can be aware of its location, the robot 100 can keep a log or record of which areas or rooms of the map are dirtier or where more dirt is collected. This information can be used in several ways, as discussed further below.

The image capture device 140 can be configured to generate a signal based on imagery of the environment 40 of the robot 100 as the robot 100 moves about the floor surface 50. The image capture device 140 can transmit such a signal to the controller 112. The controller 112 can use the signal or signals from the image capture device 140 for various tasks, algorithms, or the like, as discussed in further detail below.

In some examples, obstacle following sensors can detect detectable objects, including obstacles such as furniture, walls, persons, and other objects in the environment of the robot 100. In some implementations, the sensor system can include an obstacle following sensor along the side surface, and the obstacle following sensor can detect the presence or the absence of an object adjacent to the side surface. The one or more obstacle following sensors can also serve as obstacle detection sensors, similar to the proximity sensors described herein.

The robot 100 can also include sensors for tracking a distance travelled by the robot 100. For example, the sensor system can include encoders associated with the motors 116 for the drive wheels 118, and the encoders can track a distance that the robot 100 has travelled. In some implementations, the sensor can include an optical sensor facing downward toward a floor surface. The optical sensor can be positioned to direct light through a bottom surface of the robot 100 toward the floor surface 50. The optical sensor can detect reflections of the light and can detect a distance travelled by the robot 100 based on changes in floor features as the robot 100 travels along the floor surface 50.

The controller 112 can use data collected by the sensors of the sensor system to control navigational behaviors of the robot 100 during the mission. For example, the controller 112 can use the sensor data collected by obstacle detection sensors of the robot 100, (the cliff sensors, the proximity sensors, and the bump sensors) to enable the robot 100 to avoid obstacles within the environment of the robot 100 during the mission.

The sensor data can also be used by the controller 112 for simultaneous localization and mapping (SLAM) techniques in which the controller 112 extracts features of the environment represented by the sensor data and constructs a map of the floor surface 50 of the environment. The sensor data collected by the image capture device 140 can be used for techniques such as vision-based SLAM (VSLAM) in which the controller 112 extracts visual features corresponding to objects in the environment 40 and constructs the map using these visual features. As the controller 112 directs the robot 100 about the floor surface 50 during the mission, the controller 112 can use SLAM techniques to determine a location of the robot 100 within the map by detecting features represented in collected sensor data and comparing the features to previously stored features. The map formed from the sensor data can indicate locations of traversable and nontraversable space within the environment. For example, locations of obstacles can be indicated on the map as nontraversable space, and locations of open floor space can be indicated on the map as traversable space.

The sensor data collected by any of the sensors can be stored in the memory 126. In addition, other data generated for the SLAM techniques, including mapping data forming the map, can be stored in the memory 126. These data produced during the mission can include persistent data that are produced during the mission and that are usable during further missions. In addition to storing the software for causing the robot 100 to perform its behaviors, the memory 126 can store data resulting from processing of the sensor data for access by the controller 112. For example, the map can be a map that is usable and updateable by the controller 112 of the robot 100 from one mission to another mission to navigate the robot 100 about the floor surface 50.

The persistent data, including the persistent map, can help to enable the robot 100 to efficiently clean the floor surface 50. For example, the map can enable the controller 112 to direct the robot 100 toward open floor space and to avoid nontraversable space. In addition, for subsequent missions, the controller 112 can use the map to optimize paths taken during the missions to help plan navigation of the robot 100 through the environment 40.

The controller 112 can also send commands to a motor (internal to the body 102) to drive the arms 106 to move the pad assembly 108 between the stored position (shown in FIGS. 2A and 2D) and the deployed position (shown in FIGS. 2C and 2E). In the deployed position, the pad assembly 108 (which can include a pad tray 142 supporting the mopping pad 142) can be used to mop a floor surface of any room of the environment 40. The mopping pad 142 can be a dry pad or a wet pad. Optionally, when the mopping pad 142 is a wet pad, the pump 134 can be operated by the controller 112 to spray or drop fluid (e.g., water or a cleaning solution) onto the floor surface 50 or the mopping pad 142. The wetted mopping pad 142 can then be used by the robot 100 to perform wet mopping operations on the floor surface 50 of the environment 40.

Network Examples

Figure 3:
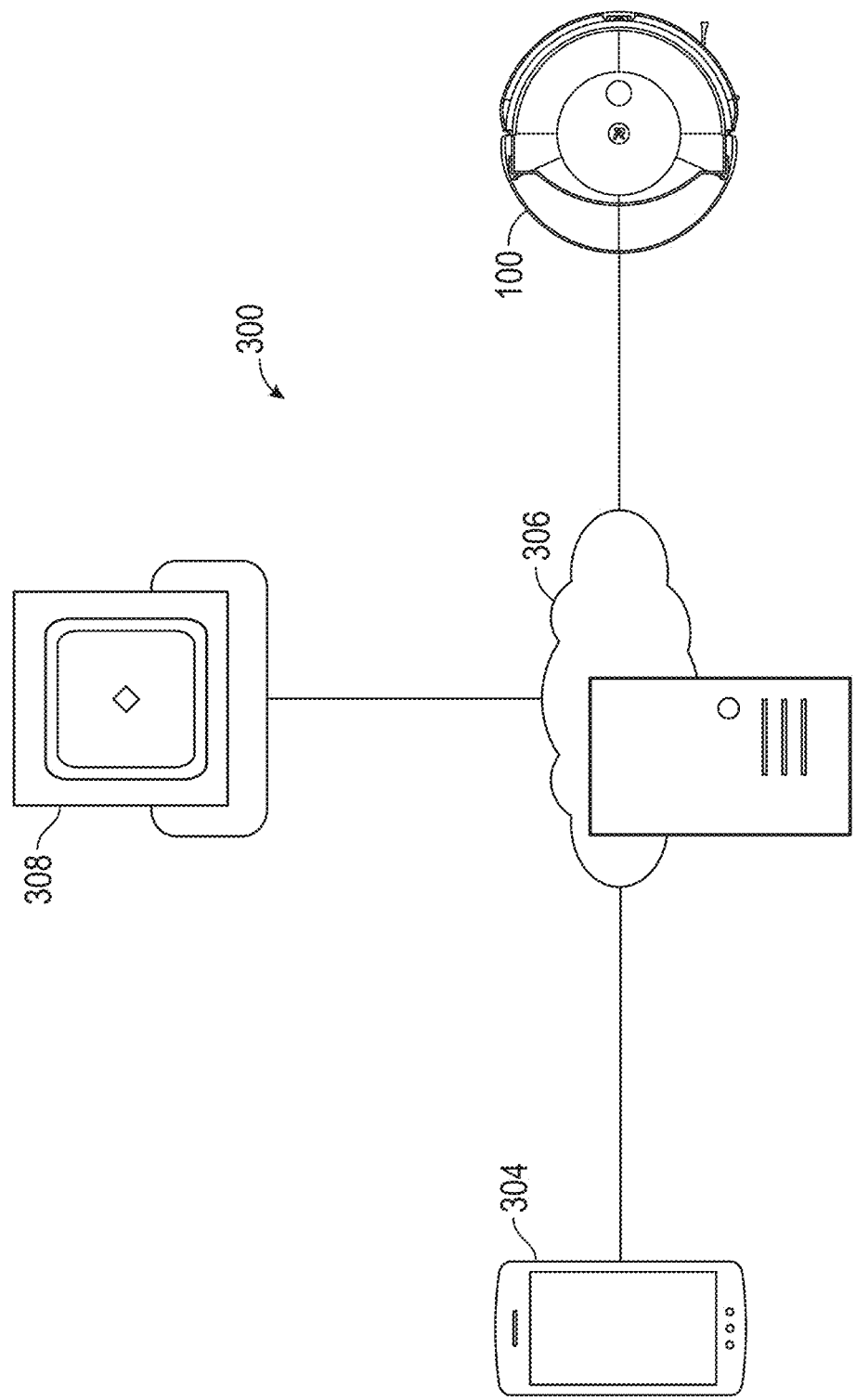
FIG. 3 illustrates a diagram illustrating an example of a communication network in which a mobile cleaning robot operates and data transmission in the network.

FIG. 3 is a diagram illustrating by way of example and not limitation a communication network 300 that enables networking between the mobile robot 100 and one or more other devices, such as a mobile device 304, a cloud computing system 306, or another autonomous robot 308 separate from the mobile robot 100. Using the communication network 300, the robot 100, the mobile device 304, the robot 308, and the cloud computing system 306 can communicate with one another to transmit and receive data from one another. In some examples, the robot 100, the robot 308, or both the robot 100 and the robot 308 communicate with the mobile device 304 through the cloud computing system 306. Alternatively, or additionally, the robot 100, the robot 308, or both the robot 100 and the robot 308 communicate directly with the mobile device 304. Various types and combinations of wireless networks (e.g., Bluetooth, radio frequency, optical based, etc.) and network architectures (e.g., wi-fi or mesh networks) can be employed by the communication network 300.

In some examples, the mobile device 304 can be a remote device that can be linked to the cloud computing system 306 and can enable a user to provide inputs. The mobile device 304 can include user input elements such as, for example, one or more of a touchscreen display, buttons, a microphone, a mouse, a keyboard, or other devices that respond to inputs provided by the user. The mobile device 304 can also include immersive media (e.g., virtual reality) with which the user can interact to provide input. The mobile device 304, in these examples, can be a virtual reality headset or a head-mounted display.

The user can provide inputs corresponding to commands for the mobile robot 100. In such cases, the mobile device 304 can transmit a signal to the cloud computing system 306 to cause the cloud computing system 306 to transmit a command signal to the mobile robot 100. In some implementations, the mobile device 304 can present augmented reality images. In some implementations, the mobile device 304 can be a smart phone, a laptop computer, a tablet computing device, or other mobile device.

According to some examples discussed herein, the mobile device 304 can include a user interface configured to display a map of the robot environment. A robot path, such as that identified by a coverage planner, can also be displayed on the map. The interface can receive a user instruction to modify the environment map, such as by adding, removing, or otherwise modifying a keep-out zone in the environment, adding, removing, or otherwise modifying a focused cleaning zone in the environment (such as an area that requires repeated cleaning); restricting a robot traversal direction or traversal pattern in a portion of the environment; or adding or changing a cleaning rank, among others.

In some examples, the communication network 300 can include additional nodes. For example, nodes of the communication network 300 can include additional robots. Also, nodes of the communication network 300 can include network-connected devices that can generate information about the environment 20. Such a network-connected device can include one or more sensors, such as an acoustic sensor, an image capture system, or other sensor generating signals, to detect characteristics of the environment 40 from which features can be extracted. Network-connected devices can also include home cameras, smart sensors, or the like.

In the communication network 300, the wireless links can utilize various communication schemes, protocols, etc., such as, for example, Bluetooth classes, Wi-Fi, Bluetooth-low-energy, also known as BLE, 802.15.4, Worldwide Interoperability for Microwave Access (WiMAX), an infrared channel, satellite band, or the like. In some examples, wireless links can include any cellular network standards used to communicate among mobile devices, including, but not limited to, standards that qualify as 1G, 2G, 3G, 4G, 5G, or the like. The network standards, if utilized, qualify as, for example, one or more generations of mobile telecommunication standards by fulfilling a specification or standards such as the specifications maintained by International Telecommunication Union. For example, the 4G standards can correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards can use various channel access methods, e.g., FDMA, TDMA, CDMA, or SDMA.

Pad Assemblies

Figure 4A:
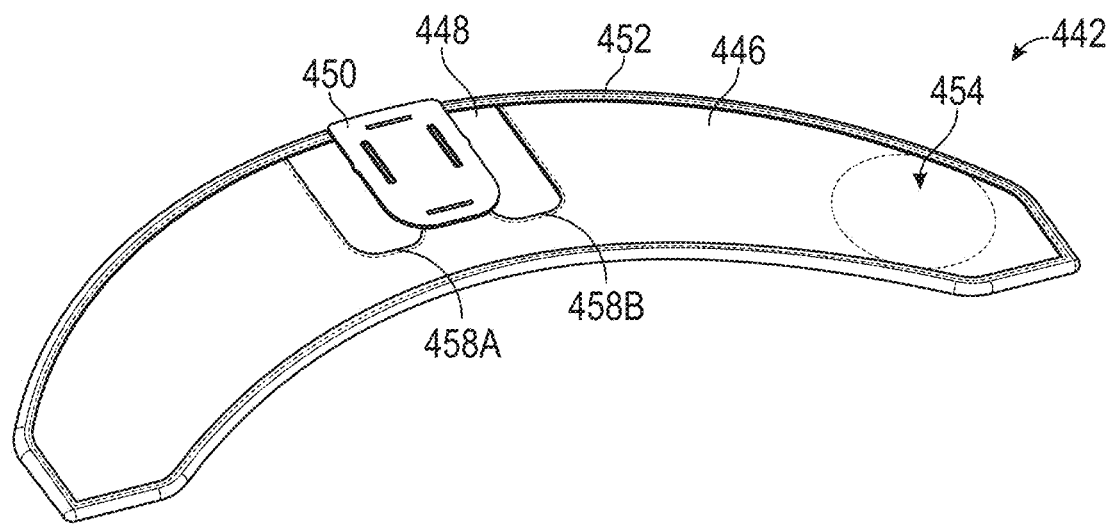
FIG. 4A illustrates an isometric view of a cleaning pad.
Figure 4B:
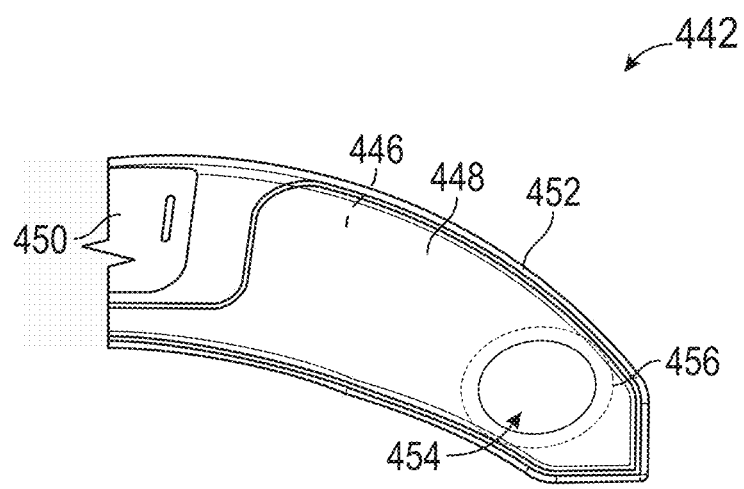
FIG. 4B illustrates an isometric view of a portion of a cleaning pad.

FIG. 4A illustrates an isometric view of a cleaning pad 442. FIG. 4B illustrates an isometric view of a portion of the cleaning pad 442. FIGS. 4A and 4B are discussed together below.

The cleaning pad 442 can be similar to the mopping pad 142 discussed above. FIGS. 4A and 4B show additional details of the cleaning pad 442. For example, FIG. 4A shows that the cleaning pad 442 can include a backing layer 446, a cleaning layer 448, a card 450, a border 452, and an identification (ID) sensor 454.

The backing layer 446 can be a material layer connected to the cleaning layer 448. The backing layer 446 can be made of one or more of fabric, polymer, silicone, foam, metal, fibers, or the like. In some examples, the backing layer 446 can include a plurality of loop fasteners (e.g., Velcro) configured to engage a plurality of corresponding hook fasteners of the pad tray (e.g., to secure the backing layer to the pad tray 143). Optionally, the backing layer 446 can include hook fasteners for engaging loop fasteners of the tray 143. The backing layer 446 can be made of Brush Velcro, SV 170 GSM, SV 270 GSM, or the like. The backing layer 446 can have a thickness between 0.5 millimeters (mm) and 3 mm.

The cleaning layer 448 can be a material layer connected to the backing layer 446. The cleaning layer 448 can be made of one or more of fabric, polymer, silicone, foam, metal, fibers, or the like. In some examples, the cleaning layer 448 can be made of one or more of cotton, nylon, polyester, or the like. The cleaning layer 448 can have a thickness between 3 mm and 10 mm. The backing layer 446 can be secured to the cleaning layer 448 using one or more of stitching, adhesive, fasteners, or the like.

The card 450 can be a rigid or semi-rigid body made of one or more of metals, plastics, foams, elastomers, ceramics, composites, combinations thereof, or the like. As discussed in further detail below, the card 450 can have a shape of a rectangular prism with rounded corners and having a relatively small height or thickness. The card 450 can be secured to one or more of the backing layer 446 and the cleaning layer 448 using one or more of stitching, adhesive, fasteners, or the like. The card 450 can be engaged with or directly affixed to the backing layer 446. As discussed in further detail below, the card 450 can be slidably insertable into a retainer of the pad tray (e.g., 143) to align the cleaning pad 442 with the tray and to help secure the cleaning pad 442 to the pad tray of the mobile cleaning robot 100.

The border 452 can be made of one or more of fabric, polymer, silicone, foam, metal, fibers, or the like. The border 452 can at least partially cover a perimeter edge of the cleaning layer 448 or a perimeter edge of the backing layer 446. The border 452 can be secured to the backing layer 446 or the cleaning layer 448 using one or more of stitching, adhesive, fasteners, or the like. Optionally, the border 452 can be secured to one or more of the backing layer 446 and the cleaning layer 448 using stitching.

The ID sensor 454 can be a radio frequency identification (RFID) chip, near field communication (NFC) chip, ultra wide band sensor (UWB), WiFi sensor, magnetic sensor, inductive sensor, infrared sensor, optical sensor, or the like. As shown in FIG. 4B, which shows the backing layer 446 in phantom, the sensor 454 can be located at least partially between the backing layer 446 and the cleaning layer 448 such as to secure the sensor 454 to the cleaning pad 442. The sensor 454 can optionally be secured between the backing layer 446 and the cleaning layer 448 by stitching 456 such that the sensor 454 is sewn into the backing layer 446 or the cleaning layer 448.

Also, as shown in FIG. 4A, the backing layer 446 can include a pair of cutouts 458a and 458b. Optionally the cutouts 458 can be a single cutout or can be 3, 4, 5, 6, or the like cutouts. The cutouts 458 can be located at least partially between the card 450 and the cleaning layer 448. The cutouts 458 can be configured to receive the retainer of the pad tray therein, when the pad is connected to the pad tray, such as to form a planar cleaning layer surface as discussed in further detail below.

FIG. 5A illustrates a top view of the cleaning pad 442. FIG. 5B illustrates a rear view of the cleaning pad 442. FIGS. 5A and 5B are discussed together below. The cleaning pad 442 of FIGS. 5A and 5B can be consistent with the cleaning pad 442 and the mopping pad 142. FIGS. 5A and 5B show additional details of the cleaning pad 442.

For example, FIG. 5A shows that the cleaning pad 442 can have a width A. The width A can be between 200 mm and 350 mm. The width A can be between 250 mm and 300 mm.

The width A can be between 270 mm and 280 mm. The width A can be about 275 mm. The cleaning pad 442 can have a length B between 50 mm and 150 mm. The length B can be between 75 mm and 125 mm. The length B can be between 95 mm and 105 mm. The length B can be about 100 mm.

A front portion of the pad 442 can include segments 460, 462, and 464. The segments 460 can have a width C between 10 mm and 50 mm. The width C can be between 20 mm and 40 mm. The width C can be about 34 mm. The segments 462 can be straight or can be curved. The segments 462 can have a radius of curvature D between 125 mm and 225 mm. The curvature D can be about 173 mm. The segment 464 can have a radius of curvature E between 75 mm and 175 mm. The curvature E can be about 117 mm. A rear portion 466 can be straight or curved and can optionally have a radius of curvature F between 125 and 200 mm. The radius of curvature F can be about 166 mm. As shown in FIG. 5B, the cleaning pad 442 can have a thickness G, which can be between 3 mm and 7 mm. The thickness G can be between 4 mm and 6 mm. The thickness G can be about 5 mm.

FIG. 6A illustrates a top view of the card 450 of the cleaning pad 442. FIG. 6B illustrates a side view of the card 450 of the cleaning pad 442. FIGS. 6A and 6B are discussed together below. The card 450 of FIGS. 6A and 6B can be consistent with the card 450 of FIGS. 4A-5B. FIGS. 6A-6B show additional details of the card 450.

For example, FIG. 6A shows that the card 450 is at least partially defined by four edges 468a-468d that can be connected by a pair of rear corners 470a and 470d and a pair of front corners 470b and 470c. The front corners 470b and 470c can be defined by a front radius of curvature that is larger than a rear radius of curvature that defines the rear corners 470a and 470d. Together, the edges 468 and the corners 470 can define an irregular rectangular shape having rounded corners. For example, one or more of the edges 468 can be rounded, curved, or not straight.

FIGS. 6A and 6B also show several dimensions of the card 450. For example, FIG. 6A shows that the card 450 can define or have a width H, which can be between 10 mm and 50 mm. In some examples, the width H of the card 450 can be between 25 mm and 35 mm. In some examples, the card 450 can have a width H between 28 mm and 32 mm. In some examples, the card 450 can have a width H of 30 mm.

As shown in FIG. 6B, the card 450 can have a length I between 20 mm and 60 mm. In some examples, the length I can be between 30 and 50 mm. In some examples, the length I can be between 38 mm and 42 mm. In some examples, the length I can be about 40 mm. FIG. 6B also shows that the card 450 can have a thickness J between 0.3 mm and 1.5 mm. In some examples, the thickness J can be between 0.6 mm and 1.0 mm. In some examples, the card 450 can have a thickness J of about 0.8 mm.

FIG. 6A also shows that the card 450 can include detents 472a and 472b. The detent 472a can extend outward from the edge 468a and the detent 472b can extend outward from the edge 468c. The detents 472 can extend from the opposing edges 468a and 468c, respectively by a distance K, which can be between 0.1 mm and 1 mm. In some examples, the distance K can be between 0.3 millimeters and 0.5 millimeters. In some examples, the distance K can be about 0.4 mm.

FIG. 6A also shows that the 450 can include slots 474a and 474b that can be respectively located near detents 472a and 472b. The slots 474 can allow the detents 472 to reversibly deflect laterally inward, such as in response to a force, as discussed in further detail below. Each of the slots 474 can be defined by a length L and a width M. The length L can be between 5 mm and 30 mm. In some examples, the length L can be between 10 mm and 20 mm. In some examples, the length L can be about 15 mm. The width M of the slots 474 can be between 0.5 mm and 4 mm. In some examples, the width M can be between 1 mm and 3 mm. In some examples, the width M can be about 2 mm.

Figure 7A:
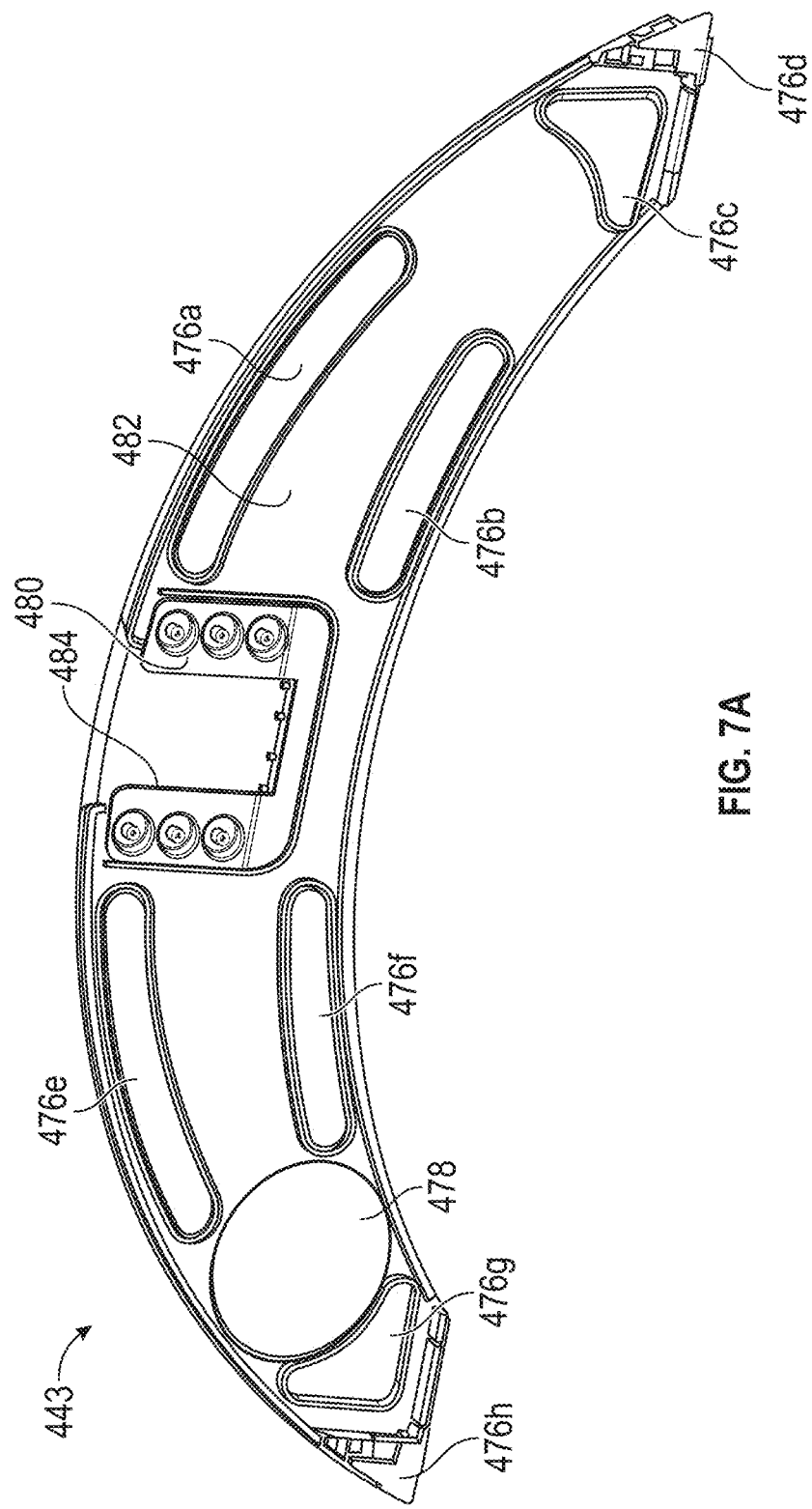
FIG. 7A illustrates an isometric view of a portion of a pad tray.

FIG. 7A illustrates an isometric view of a portion of a pad tray 443. The pad tray 443 can be similar to the tray 143 discussed above. FIG. 7A shows the tray 443 in further detail. For example, FIG. 7A shows that the tray 443 can include retainers 476a-476h. The retainers 476a-476h can each include one or more hook fasteners configured to engage with the loop fasteners of the backing layer 446 to help secure the cleaning pad 442 to the 443. As shown in FIG. 7A, the retainers 476 can be located near or at perimeter portions of the pad tray 443 such as to help ensure edges of the 442 remain connected to the 443 during cleaning operations.

FIG. 7A also shows that the pad tray 443 can include a sensor interface 478. The sensor interface 478 can be configured to at least partially receive the sensor 454 therein. That is, the sensor interface 478 can be sized and shaped complimentary to the sensor 454 to receive at least a portion of the sensor 454 therein. The sensor interface 478 can optionally include one or more devices for interacting with the sensor 454 such as a scanner, sensor, or the like, for identifying or authenticating the sensor 454 and the cleaning pad 442. The sensor 454 or the device of the interface 478 can also communicate with the controller 112 to identify or authenticate the sensor 454 and the cleaning pad 442.

FIG. 7A further shows that the pad tray 443 can include a retainer 480 that can be secured to a body 482 of the pad tray 443. The retainer 480 can at least partially define a slot 484 or track configured to receive and retain the card 450 therein to help secure the cleaning pad 442 to the pad tray 443. The retainer 480 is discussed in further detail below.

FIG. 7B illustrates an isometric view of a portion of the pad tray 443. The pad tray 443 can be consistent with the cleaning pad 442 and the pad tray 443 discussed above. FIG. 7B shows additional details of the pad tray 443.

For example, FIG. 7B shows a connector 481 insertable into a notch 483 of the pad tray 443. The connector 481 can be connectable to an arm (e.g., arm 106) of the robot (e.g., robot 100) such as via a pivot pin 485 that can be insertable into a bore 487 of the connector 481 and a bore of the pad tray 443. The bore 487 can also be secured to the pad tray 443 via a fastener 489, which can be a screw, rivet, or the like. The connector 481 can enable rotation of the pad tray 443 relative to the arms (e.g., 106). The connector 481 can also include a hook 491 for engaging and at least partially retaining a body of the connector 481 to the pad tray 443.

Figure 8A:
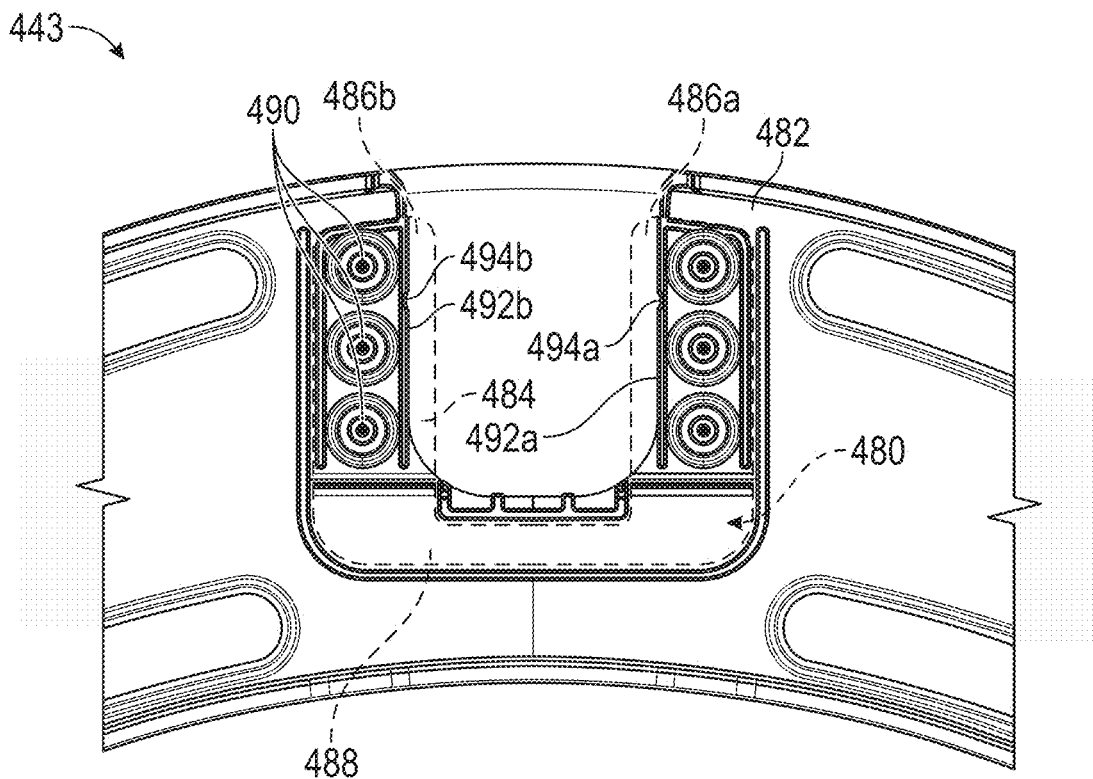
FIG. 8A illustrates a bottom view of a portion of a pad tray.
Figure 8B:
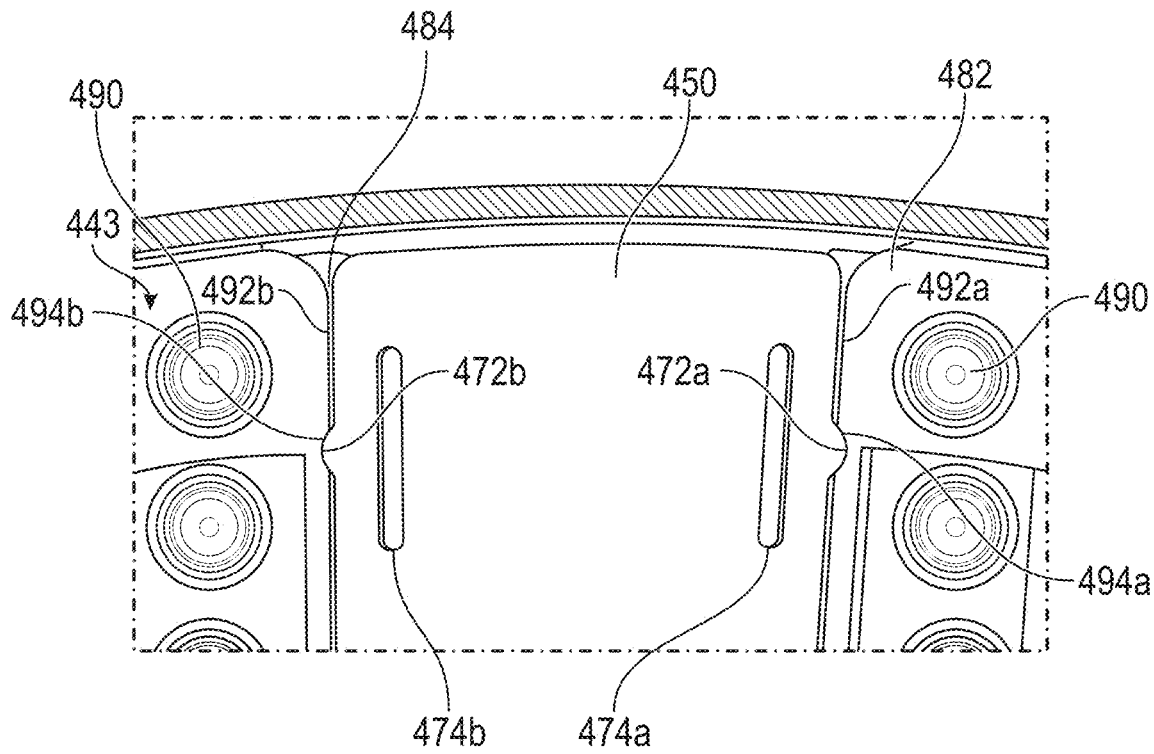
FIG. 8B illustrates a bottom view of a portion of a pad tray and a portion of a cleaning pad.

FIG. 8A illustrates a bottom view of a portion of the pad tray 443 with the retainer 480 shown in phantom. FIG. 8B illustrates a bottom view of a portion of the pad tray 443 and a portion of the cleaning pad 442. FIGS. 8A and 8B are discussed together below. The cleaning pad 442 and the pad tray 443 can be consistent with the cleaning pad 442 and the pad tray 443 discussed above. FIGS. 8A and 8B show additional details of the pad tray 443 and how the card 450 can interact with the retainer 480.

FIG. 8A shows the pad tray 443 in a condition where no pad is secured to the pad tray 443 and no card is inserted into the retainer 480. FIG. 8A shows that the retainer 480 can include rails 486a and 486b extending from a body 488 of the retainer 480. The rails 486 can together, at least in part, form the slot 484. The rails 486 can be secured to the body 482 of the pad tray 443 via one or more fasteners 490. The fasteners 490 can be screws, rivets, thermal fasteners (heat steaks), or the like. The rails 486 can, together with walls 492a and 492b, of the body 482 of the pad tray 443, form the slot 484 for receipt of the card 450, as discussed in further detail below. FIG. 8A also shows that the walls 492a and 492b can include, respectively, recesses 494a and 494b configured to receive detents 472a and 472b therein.

FIG. 8B shows the card 450 secured within the retainer 480 of the pad tray 443 such that the card 450 is located between the rails 486 and the body 482 and between the walls 492a and 492b. When the card 450 is fully inserted into the slot 484, the detents 472a and 472b can be inserted into the recesses 494a and recesses 494b respectively to help secure the cleaning pad 442 to the pad tray 443.

As the card 450 is inserted between the walls 492, the detents 472 can engage the walls 492 and can reversibly (elastically) deflect laterally inward. This deflection by the detents 472 can be at least partially enabled by the slots 474 located near the detents 472. As the card 450 is fully inserted, the detents 472 can align with the recesses 494, allowing the detents 472 to extend laterally outward and into the recesses 494 to help secure the cleaning pad 442 to the pad tray 443, as shown in FIG. 8B.

Figure 9:
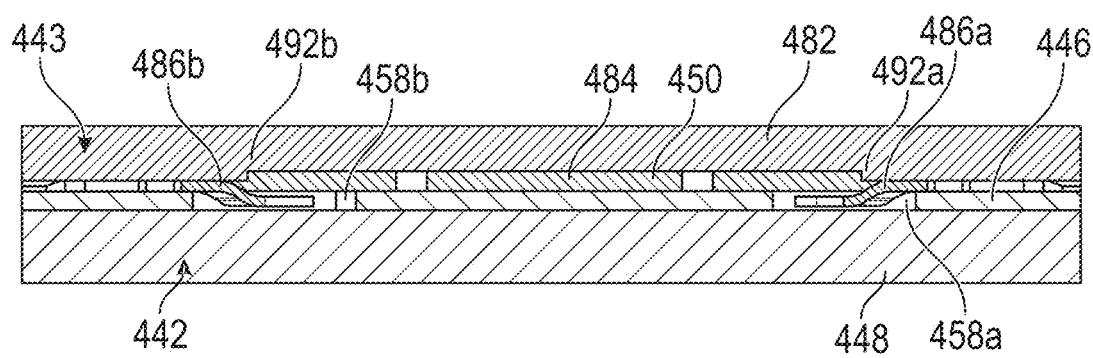
FIG. 9 illustrates a rear view of a portion of a pad tray and a portion of a cleaning pad.

FIG. 9 illustrates a rear view of a portion of the pad tray 443 and a portion of the cleaning pad 442 when the cleaning pad 442 is secured to the pad tray 443. More specifically, FIG. 9 shows that the card 450 can be inserted into the slot 484 at least partially formed by the rails 486a and 486b such that the card 450 is limited from moving vertically with respect to the pad tray 443 by contact with the rails 486 and the body 482. FIG. 9 also shows that lateral movement of the card 450 with respect to the pad tray 443 can be limited by engagement between the card 450 and the walls 492a and 492b of the body 482.

FIG. 9 further shows that the rails 486a and 486b can extend into cutouts 458a and 458b, respectively, of the cleaning layer 448 of the cleaning pad 442 when the cleaning pad 442 is secured to the pad tray 443. Together, the rails 486a and 486b and the backing layer 446 can form a planar or relatively planar surface for engaging with the cleaning layer 448 such that the cleaning layer 448 forms a planar or relatively planar cleaning surface of the cleaning layer 448.

Figure 10A:
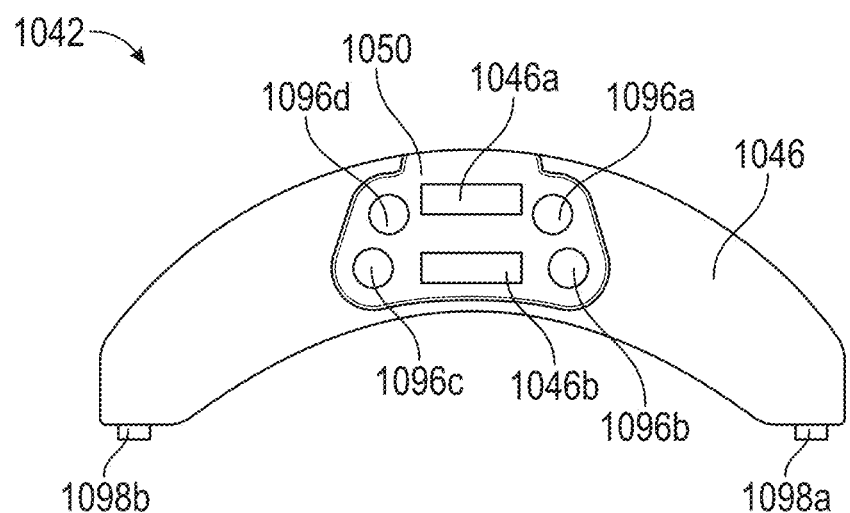
FIG. 10A illustrates a top view of a cleaning pad.
Figure 10B:
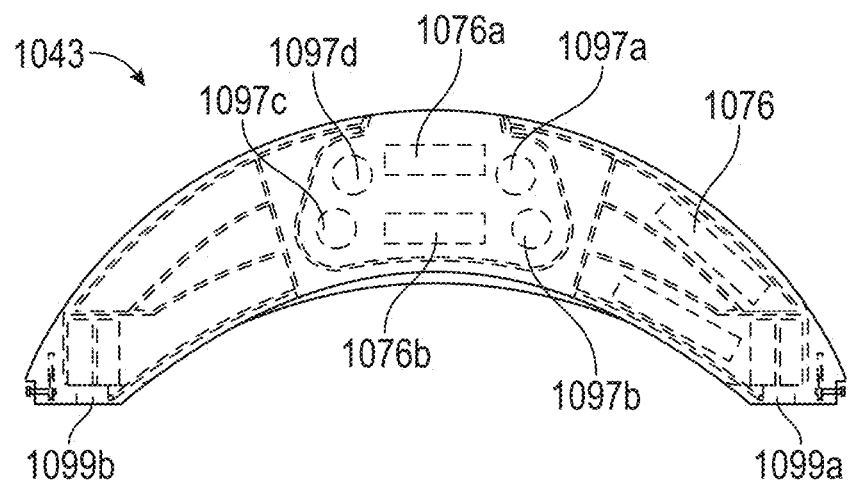
FIG. 10B illustrates a bottom view of a pad tray.
Figure 10C:
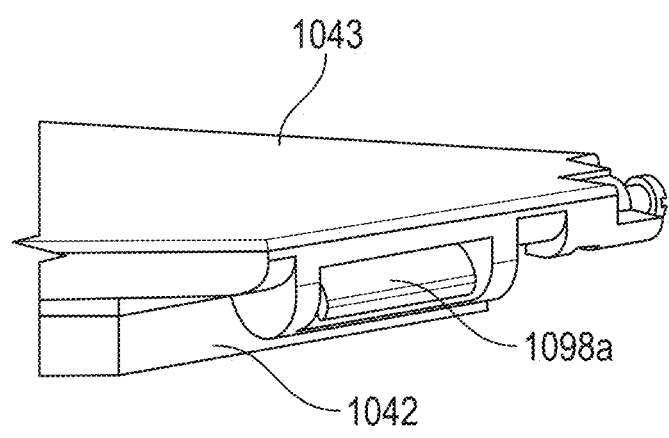
FIG. 10C illustrates a side isometric view of a portion of a pad tray and a portion of a cleaning pad.

FIG. 10A illustrates a top view of a cleaning pad 1042. FIG. 10B illustrates a bottom view of a pad tray 1043. FIG. 10C illustrates a side isometric view of a portion of the pad tray 1043 and a portion of the cleaning pad 1042. FIGS. 10A-10C are discussed together below. The pad 1042 and the tray 1043 can be similar to the pads and trays discussed above or below. The pad 1042 and the tray 1043 can include fasteners and alignment features in and around the card. Any of the pads and trays discussed herein can be modified to include the features of the pad 1042 and the tray 1043.

As shown in FIG. 10A, the pad 1042 can include a card 1050 that includes bores 1096a-1096d. The bores 1096a-1096d can extend downward into the card 1050 and can receive posts 1097 of the tray (shown in FIG. 10B). The pad 1042 can also include a backing layer 1046 including loop fasteners. The backing layer 1046 can also include fastener sections 1046a and 1046b in the 1050 to help secure the center of the 1050 to the pad tray 1043. The pad 1042 can also include hooks 1098a and 1098b. The hooks 1098 can extend from front portions of the pad 1042 and can be configured to engage slots of the pad tray 1043 to secure the pad 1042 to the pad tray 1043.

As shown in FIG. 10B, the pad tray 1043 can include a plurality of retainers 1076 that can include hook fasteners. The pad tray 1043 can include retainers 1076a and 1076b engageable with fastener sections 1046a and 1046b to help secure the card 1050 and therefore the pad 1042 to the pad tray 1043. The pad tray 1043 can also include bosses 1097a-1097d. The bosses 1097a-1097d can be insertable into the bores 1096a-1096d of the pad 1042, respectively, to help align the pad 1042 with the pad tray 1043, such as to align the retainers 1076a and 1076b with the fastener sections 1046a and 1046b. When the bosses 1097a-1097d are inserted into the bores 1096a-1096d, the bosses 1097a-1097d can engage the bores 1096a-1096d to help to limit relative movement of the pad 1042 with respect to the pad tray 1043. FIG. 10B also shows that the pad tray 1043 can include slots 1099a and 1099b configured to receive and retain the hooks 1098a and 1098b, respectively, of the pad 1042 to help secure the pad 1042 to the pad tray 1043.

The bosses 1097a-1097d can engage the bores 1096a-1096d to also help to limit premature connection between the retainers 1076 of the pad tray 1043 and retainers of the pad (e.g., hook and loop fasteners) such that the retainers do not connect to each other before the pad 1042 is properly aligned with the tray 1043, helping to limit incorrect attachments of the pad 1042 to the pad tray 1043.

FIG. 10C shows how the hook 1098a can be inserted into the slot 1099a to help secure the pad 1042 to the pad tray 1043. Because the hooks 1098 are located on the leading (front) edge of the pad 1042, the hooks 1098 can help prevent the leading edge of the pad 1042 from separating from the pad tray 1043 during cleaning (e.g., mopping operations).

Figure 11A:
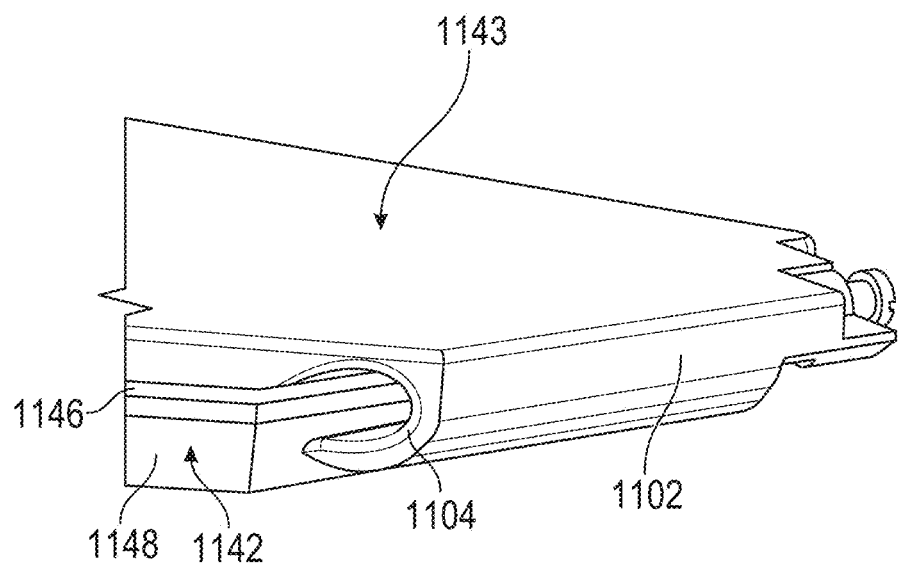
FIG. 11A illustrates a side isometric view of a portion of a pad tray and a portion of a cleaning pad.
Figure 11B:
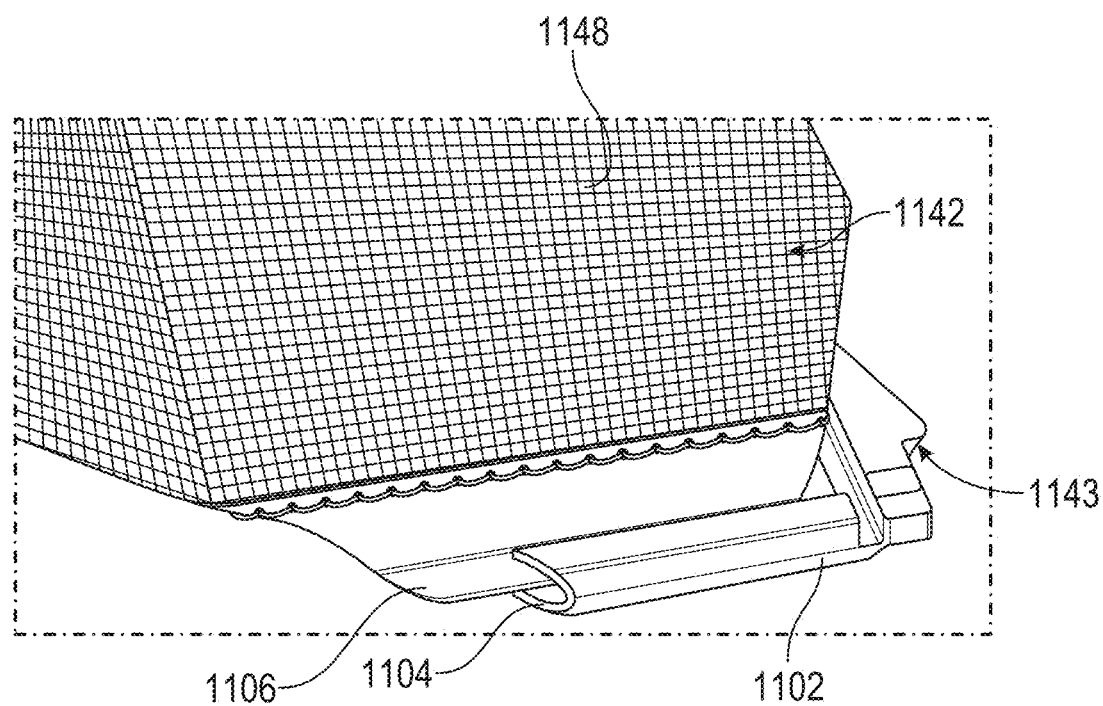
FIG. 11B illustrates a front isometric view of a portion of a pad tray and a portion of a cleaning pad.

FIG. 11A illustrates a side isometric view of a portion of a pad tray 1143 and a portion of a cleaning pad 1142. FIG. 11B illustrates a front isometric view of a portion of the pad tray 1143 and a portion of the cleaning pad 1142. FIGS. 11A and 11B are discussed together below. The pad 1142 and the tray 1143 can be similar to the pads and trays discussed above or below. The pad 1142 and the tray 1143 can include a projection and a slot for securing the pad 1142 to the tray 1143. Any of the pads and trays discussed herein can be modified to include the features of the pad 1142 and the tray 1143.

More specifically, FIG. 11A shows that the tray 1143 can include a slot 1104 in a front portion 1102 or wing of the tray 1143. The slot 1104 can extend laterally into the front portion 1102. As shown in FIG. 11B, the pad 1142 can include a projection 1106 connected to a cleaning layer 1148 (or to a backing layer 1146 or to a border). As also shown in FIG. 11B, the projection 1106 can be insertable into the slot 1104 to secure the pad 1142 to the tray 1143. Because the projection(s) 1106 is (are) located on the leading edge of the pad 1142, the projection 1106 can help prevent the leading edge of the pad 1142 from separating from the pad tray 1143 during cleaning (e.g., mopping operations).

Figure 12A:
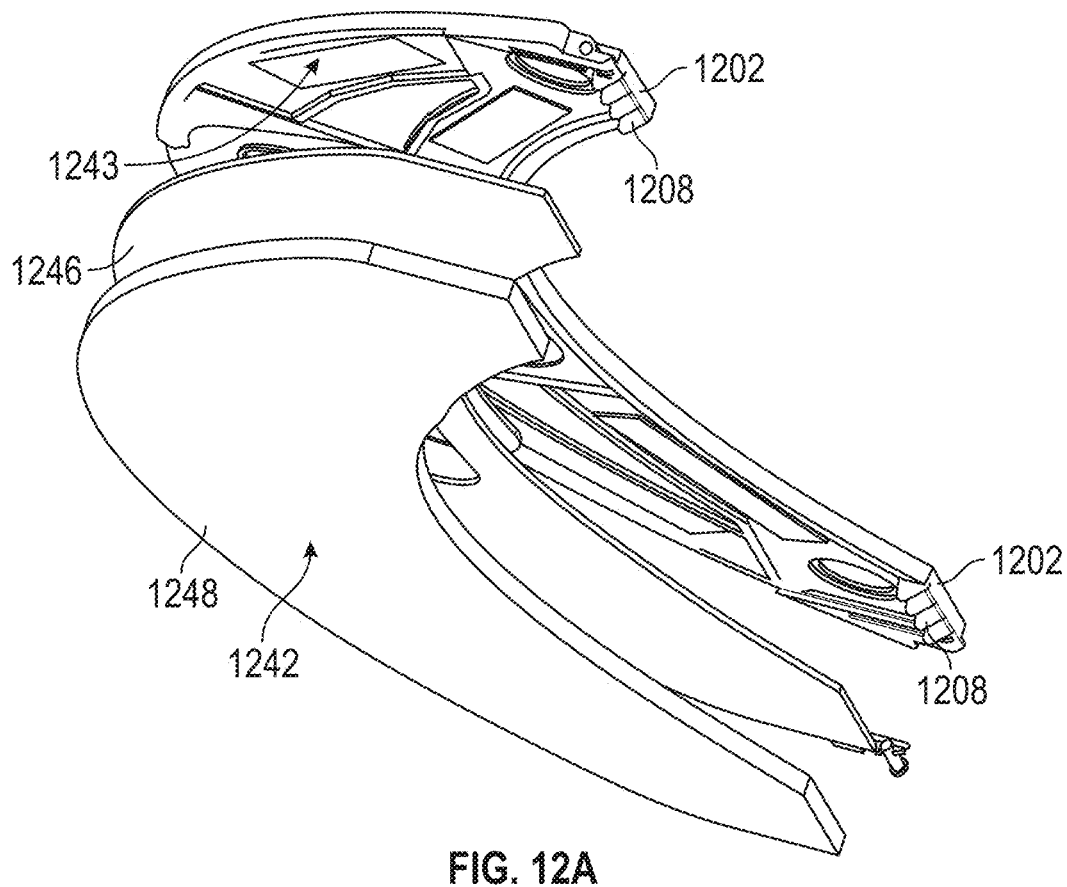
FIG. 12A illustrates a bottom isometric exploded view of a pad tray and a pad.
Figure 12B:
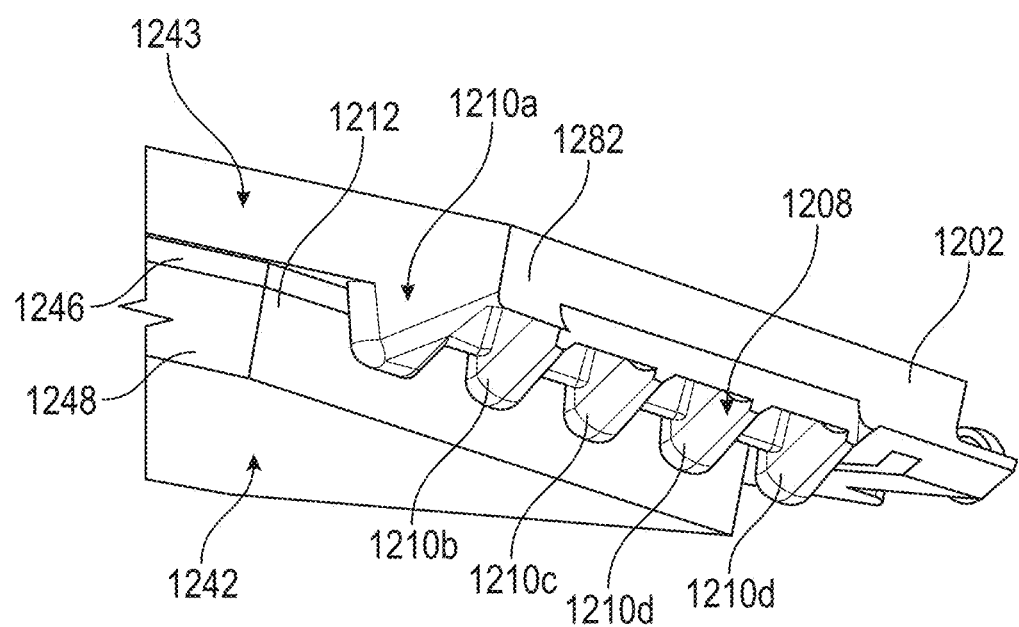
FIG. 12B illustrates a side isometric view of a portion of a pad tray and a portion of a cleaning pad.

FIG. 12A illustrates a bottom isometric exploded view of a pad tray 1243 and a pad 1242. FIG. 12B illustrates a side isometric view of a portion of a pad tray 1243 and a portion of a cleaning pad 1242. FIGS. 12A and 12B are discussed together below. The pad 1242 and the tray 1243 can be similar to the pads and trays discussed above or below. The pad 1242 and the tray 1243 can include guides engageable with a cleaning surface to limit contact between the surface and edges of the cleaning pad to help limit separation of the pad 1242 from the pad tray 1243. Any of the pads and trays discussed herein can be modified to include the features of the pad 1242 and the tray 1243.

More specifically, FIG. 12A shows that the tray 1243 can include guides 1208 located at front portions 1202 of the tray 1243. As shown in FIG. 12B, each guide 1208 can include a plurality of projections 1210a-1210d. The projections 1210 each extend downward from a body 1282 of the tray 1243 beyond the backing layer 1246 and to the cleaning layer 1248 of the pad 1242. This can allow the cleaning surface to engage the cleaning layer 1248 of the pad 1242 while helping to limit the surface, or edges of the surface, from engaging the edge 1212 of the pad 1242, helping to limit separation of the pad 1242 from the tray 1243 during a cleaning mission. The projections 1210 can optionally have curved front surfaces such as to limit snagging of the projections on floor surfaces or other objects in an environment.

Figure 13A:
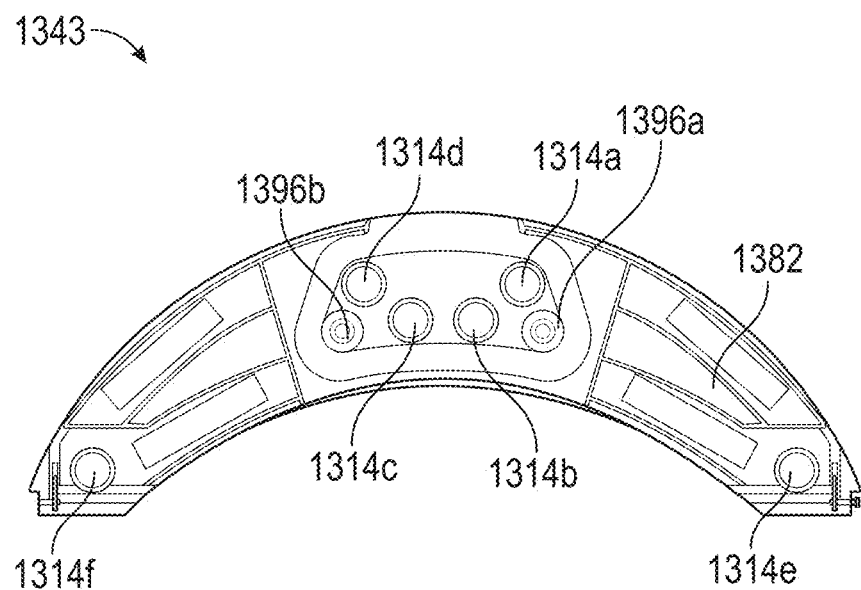
FIG. 13A illustrates a bottom view of a pad tray.
Figure 13B:
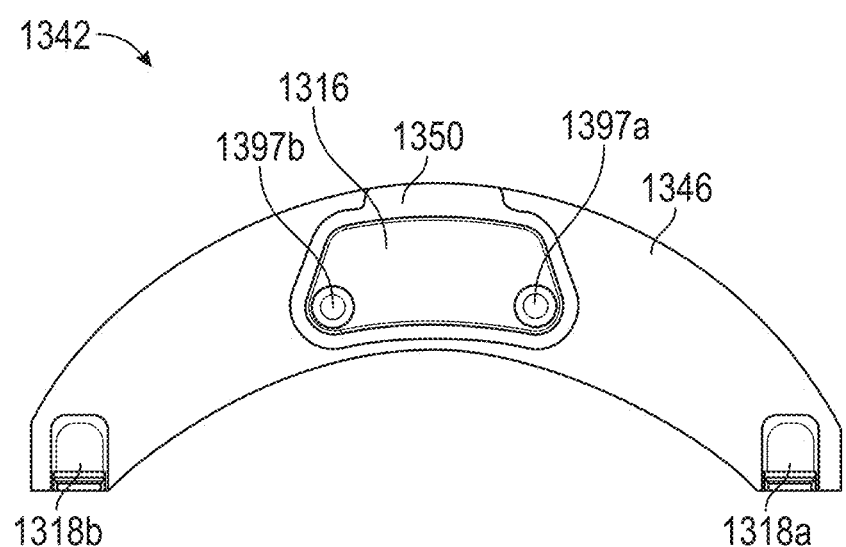
FIG. 13B illustrates a top view of a cleaning pad.

FIG. 13A illustrates a bottom view of a pad tray 1343. FIG. 13B illustrates a top view of a cleaning pad 1342. The pad 1342 and the tray 1343 can include magnetic fasteners and alignment features in and around the card. Any of the pads and trays discussed herein can be modified to include the features of the pad 1342 and the tray 1343.

More specifically, FIG. 13A shows that the tray 1343 can include magnetic fasteners 1314a-1314f. The fasteners 1314a-1314d can be located centrally and configured to engage or couple to a magnetically-attractable feature or surface 1316 of a card 1350 to secure the card 1350 to the tray 1343. The fasteners 1314e and 1314f can be located at opposing front portions or wings of the tray 1343 and can configured to engage or couple to magnetically-attractable features 1318a and 1318b, respectively, of the pad 1342 to secure the pad 1342 to the tray 1343.

The pad 1342 can also include bosses 1397a and 1397b. The bosses 1397a and 1397b can be insertable into bores 1396a-1396d of the tray 1343 to help align the pad 1342 with the pad tray 1343, such as to align the fasteners 1314a-1314d with the magnetically-attractable features 1318a and 1318b and the surface 1316. When the bosses 1397a and 1397b are inserted into the bores 1396a and 1396b, the bosses 1397a and 1397b can engage the bores 1396a and 1396b, respectively, to help to limit relative movement of the pad 1342 with respect to the pad tray 1343.

Figure 14A:
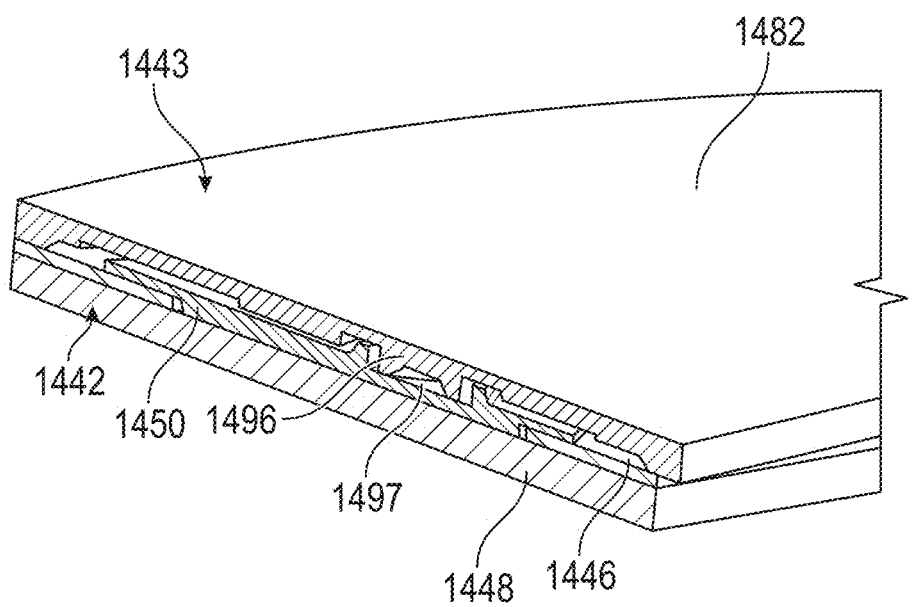
FIG. 14A illustrates a cross-sectional view of a portion of a pad tray and a portion of a cleaning pad.
Figure 14B:
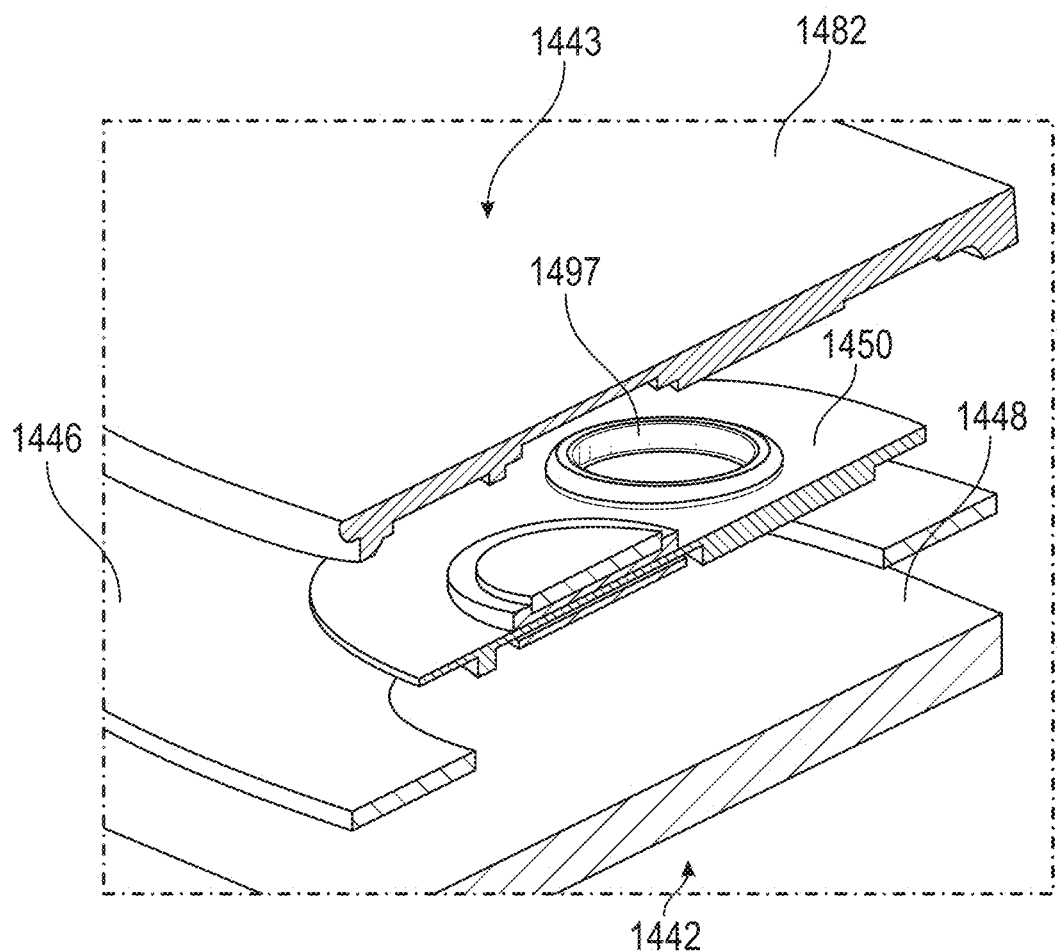
FIG. 14B illustrates an exploded cross-sectional top isometric view of a portion of a pad tray and a portion of a cleaning pad.
Figure 14C:
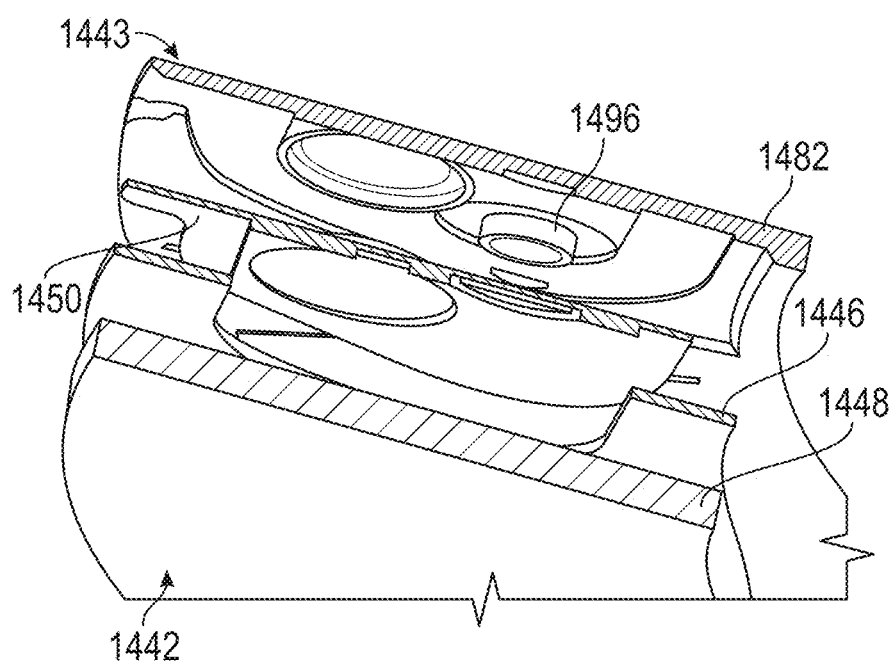
FIG. 14C illustrates an exploded cross-sectional bottom isometric view of a portion of a pad tray and a portion of a cleaning pad.

FIG. 14A illustrates a cross-sectional view of a portion of a pad tray and a portion of a cleaning pad. FIG. 14B illustrates an exploded cross-sectional top isometric view of a portion of a pad tray and a portion of a cleaning pad. FIG. 14C illustrates an exploded cross-sectional bottom isometric view of a portion of a pad tray and a portion of a cleaning pad. FIGS. 14A-14C are discussed together below. The pad 1442 and the tray 1443 can be similar to the pads and trays discussed above or below. The pad 1442 and the tray 1443 can include a boss and a bore for aligning fasteners of the pad 1442 and the tray 1443. Any of the pads and trays discussed herein can be modified to include the features of the pad 1442 and the tray 1443.

More specifically, FIGS. 14A and 14C show how a body 1482 of the tray 1443 can include a boss 1496 extending downward from the body 1482. FIGS. 14A and 14B show that a card 1450 of the pad 1442 can include a bore 1497 that can be configured (e.g., sized and shaped) to receive the boss 1496 of the tray 1443 therein. When the bosses (e.g., the boss 1496) of the tray 1443 are inserted into the bores (e.g., 1497) of the card 1450, fasteners of the tray 1443 and the pad 1442 can be brought into alignment to help ensure the pad 1442 is correctly aligned and secured to the tray 1443.

Additionally, when the bosses (e.g., the boss 1496) of the tray 1443 are inserted into the bores (e.g., the bore 1497) of the card 1450, the boss 1496 can engage the bore 1497 to limit lateral movement of the cleaning pad 1442 with respect to the pad tray 1443 when the cleaning pad 1442 is secured to the pad tray 1443. This can help to ensure that the pad 1442 remains connected to the tray 1443 during cleaning missions of the robot (e.g., the robot 100).

Notes and Examples

The following, non-limiting examples, detail certain aspects of the present subject matter to solve the challenges and provide the benefits discussed herein, among others.

Example 1 is a cleaning pad for a mobile cleaning robot, the pad comprising: a backing layer user-releasably securable to a pad tray of the mobile cleaning robot; a cleaning layer affixed to the backing layer and engageable with a floor surface; and a card connected to at least one of the backing layer and the cleaning layer and engaged with the backing layer, the card securable to a retainer of the pad tray to secure the cleaning pad to the pad tray of the mobile cleaning robot.

In Example 2, the subject matter of Example 1 optionally includes wherein the backing layer includes a plurality of loop fasteners configured to engage a plurality of corresponding hook fasteners of the pad tray to secure the backing layer to the pad tray.

In Example 3, the subject matter of Example 2 optionally includes wherein the backing layer is sewn to the cleaning layer.

In Example 4, the subject matter of Example 3 optionally includes a border covering a perimeter edge of the cleaning layer and a perimeter edge of the backing layer, the border secured to the backing layer and the cleaning layer.

In Example 5, the subject matter of Example 4 optionally includes wherein the border is sewn to the backing layer and the cleaning layer.

In Example 6, the subject matter of any one or more of Examples 4-5 optionally include wherein the card is sewn to one or more of the backing layer, the border layer, and the cleaning layer.

In Example 7, the subject matter of any one or more of Examples 4-6 optionally include wherein the card is at least partially defined by four edges connected by a pair of rear corners and a pair of front corners, and wherein the front corners are each defined by a front radius of curvature that is larger than a rear radius of curvature that defines the rear corners.

In Example 8, the subject matter of any one or more of Examples 1-7 optionally include wherein the card is at least partially defined by four edges connected by a pair of rear corners and a pair of front corners, and wherein the card includes a pair of detents extending from opposing side edges of the four edges, the detents engageable with recesses of the retainer of the pad tray to secure the cleaning pad to the pad tray of the mobile cleaning robot.

In Example 9, the subject matter of Example 8 optionally includes wherein the card includes a pair of slots located near the detents, the slots configured allow the detents to reversibly deflect laterally inward when the detents engage the retainer and to extend outward when the detents align with the recesses of the retainer.

In Example 10, the subject matter of any one or more of Examples 8-9 optionally include wherein the backing layer includes a pair of cutouts located at least partially between the card and the cleaning layer, the pair of cutouts configured to receive the retainer of the pad tray therein, when the pad is connected to the pad tray.

In Example 11, the subject matter of any one or more of Examples 1-10 optionally include an identification chip connected to one or more of the backing layer and the cleaning layer.

In Example 12, the subject matter of Example 11 optionally includes wherein the identification chip is located between the backing layer and the cleaning layer.

In Example 13, the subject matter of Example 12 optionally includes wherein the identification chip is sewn into the backing layer and the cleaning layer.

In Example 14, the subject matter of any one or more of Examples 11-13 optionally include wherein the identification chip is an RFID chip or an NFC chip.

In Example 15, the subject matter of any one or more of Examples 11-14 optionally include a magnetically-attractable feature connected to the backing layer, the magnetically-attractable feature attractable with a magnet of the pad tray to retain the pad on the pad tray.

In Example 16, the subject matter of any one or more of Examples 11-15 optionally include wherein the card includes a bore configured to receive a boss of the pad tray to limit lateral movement of the cleaning pad with respect to the pad tray when the cleaning pad is secured to the pad tray.

In Example 17, the subject matter of any one or more of Examples 11-16 optionally include wherein the card includes a boss insertable into a bore of the pad tray to limit lateral movement of the cleaning pad with respect to the pad tray when the cleaning pad is secured to the pad tray.

Example 18 is a cleaning pad for a mobile cleaning robot, the pad comprising: a backing layer user-releasably securable to a pad tray of the mobile cleaning robot, a cleaning layer connected to the backing layer and engageable with a floor surface; and a card connected to at least one of the backing layer and the cleaning layer and engaged with the backing layer, the card slidably insertable into a retainer of the pad tray to align the cleaning pad with the pad tray of the mobile cleaning robot.

In Example 19, the subject matter of Example 18 optionally includes wherein the cleaning pad has a width between 270 millimeters and 280 millimeters, and wherein the cleaning pad has a length between 95 millimeters and 105 millimeters.

In Example 20, the subject matter of any one or more of Examples 18-19 optionally include wherein the card has a width between 28 millimeters and 32 millimeters, and wherein the card has a length between 38 millimeters and 42 millimeters.

In Example 21, the subject matter of Example undefined optionally includes wherein the card has a thickness between 0.6 millimeters and 1.0 millimeters.

In Example 22, the subject matter of any one or more of Examples 18-21 optionally include wherein the card is at least partially defined by four edges connected by a pair of rear corners and a pair of front corners, and wherein the card include a pair of detents extending from opposing side edges, the detents engageable with recesses of the retainer of the pad tray to secure the cleaning pad to the pad tray of the mobile cleaning robot.

In Example 23, the subject matter of Example 22 optionally includes wherein the detents extend from the opposing edges between 0.3 millimeters and 0.5 millimeters.

In Example 24, the subject matter of any one or more of Examples 22-23 optionally include wherein the card includes a pair of slots located near the detents, the slots have a width between 1 millimeter and 3 millimeters and the slots have a length between 10 millimeters and 20 millimeters.

In Example 25, the apparatuses, systems, or methods of any one or any combination of Examples 1-24 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A cleaning pad for a mobile cleaning robot, the cleaning pad comprising:
　　a backing layer user-releasably securable to a pad tray of the mobile cleaning robot, the backing layer including a plurality of loop fasteners configured to engage a plurality of corresponding hook fasteners of the pad tray to secure the backing layer to the pad tray;
　　a cleaning layer affixed to the backing layer and engageable with a floor surface, wherein the backing layer is sewn to the cleaning layer;
　　a card connected to at least one of the backing layer and the cleaning layer and engaged with the backing layer, the card securable to a retainer of the pad tray to align the cleaning pad with the pad tray of the mobile cleaning robot; and a border covering a perimeter edge of the cleaning layer and a perimeter edge of the backing layer, the border secured to the backing layer and the cleaning layer.

2. The cleaning pad of claim 1, wherein the border is sewn to the backing layer and the cleaning layer.

3. The cleaning pad of claim 1, wherein the card is sewn to one or more of the backing layer, the border, and the cleaning layer.

4. The cleaning pad of claim 1, wherein the card is at least partially defined by four edges connected by a pair of rear corners and a pair of front corners, and wherein the front corners are each defined by a front radius of curvature that is larger than a rear radius of curvature that defines the rear corners.

5. The cleaning pad of claim 1, wherein the card is at least partially defined by four edges connected by a pair of rear corners and a pair of front corners, and wherein the card includes a pair of detents extending from opposing side edges of the four edges, the detents engageable with recesses of the retainer of the pad tray to secure the cleaning pad to the pad tray of the mobile cleaning robot.

6. The cleaning pad of claim 5, wherein the card includes a pair of slots located near the detents, the slots configured allow the detents to reversibly deflect laterally inward when the detents engage the retainer and to extend outward when the detents align with the recesses of the retainer.

7. The cleaning pad of claim 5, wherein the backing layer includes a pair of cutouts located at least partially between the card and the cleaning layer, the pair of cutouts configured to receive the retainer of the pad tray therein, when the cleaning pad is connected to the pad tray.

8. The cleaning pad of claim 1, further comprising:
an identification chip connected to one or more of the backing layer and the cleaning layer.

9. The cleaning pad of claim 8, wherein the identification chip is located between the backing layer and the cleaning layer.

10. The cleaning pad of claim 9, wherein the identification chip is sewn into the backing layer and the cleaning layer.

11. The cleaning pad of claim 8, wherein the identification chip is an RFID chip or an NFC chip.

12. The cleaning pad of claim 8, further comprising:
a magnetically-attractable feature connected to the backing layer, the magnetically-attractable feature attractable with a magnet of the pad tray to retain the cleaning pad on the pad tray.

13. The cleaning pad of claim 8, wherein the card includes a bore configured to receive a boss of the pad tray to limit lateral movement of the cleaning pad with respect to the pad tray when the cleaning pad is secured to the pad tray.

14. The cleaning pad of claim 8, wherein the card includes a boss insertable into a bore of the pad tray to limit lateral movement of the cleaning pad with respect to the pad tray when the cleaning pad is secured to the pad tray.

15. A cleaning pad for a mobile cleaning robot, the cleaning pad comprising:
a backing layer user-releasably securable to a pad tray of the mobile cleaning robot;
a cleaning layer affixed to the backing layer and engageable with a floor surface;
a card connected to at least one of the backing layer and the cleaning layer and engaged with the backing layer, the card securable to a retainer of the pad tray to align the cleaning pad with the pad tray of the mobile cleaning robot;
an identification chip connected to one or more of the backing layer and the cleaning layer; and
a magnetically-attractable feature connected to the backing layer, the magnetically-attractable feature attractable with a magnet of the pad tray to retain the cleaning pad on the pad tray.

16. The cleaning pad of claim 15, comprising:
a border covering a perimeter edge of the cleaning layer and a perimeter edge of the backing layer, the border sewn to the backing layer and the cleaning layer.

17. The cleaning pad of claim 16, wherein the card is sewn to one or more of the backing layer, the border, and the cleaning layer.

18. The cleaning pad of claim 15, wherein the card is at least partially defined by four edges connected by a pair of rear corners and a pair of front corners, and wherein the front corners are each defined by a front radius of curvature that is larger than a rear radius of curvature that defines the rear corners.

19. A cleaning pad for a mobile cleaning robot, the cleaning pad comprising:
a backing layer user-releasably securable to a pad tray of the mobile cleaning robot;
a cleaning layer affixed to the backing layer and engageable with a floor surface;
a card connected to at least one of the backing layer and the cleaning layer and engaged with the backing layer, the card securable to a retainer of the pad tray to align the cleaning pad with the pad tray of the mobile cleaning robot, the card including a bore configured to receive a boss of the pad tray to limit lateral movement of the cleaning pad with respect to the pad tray when the cleaning pad is secured to the pad tray; and
an identification chip connected to one or more of the backing layer and the cleaning layer.

20. The cleaning pad of claim 19, wherein the card is at least partially defined by four edges connected by a pair of rear corners and a pair of front corners, and wherein the card includes a pair of detents extending from opposing side edges of the four edges, the detents engageable with recesses of the retainer of the pad tray to secure the cleaning pad to the pad tray of the mobile cleaning robot.

21. The cleaning pad of claim 20, wherein the card includes a pair of slots located near the detents, the slots configured allow the detents to reversibly deflect laterally inward when the detents engage the retainer and to extend outward when the detents align with the recesses of the retainer.

22. The cleaning pad of claim 20, wherein the backing layer includes a pair of cutouts located at least partially between the card and the cleaning layer, the pair of cutouts configured to receive the retainer of the pad tray therein, when the cleaning pad is connected to the pad tray.

23. The cleaning pad of claim 19, wherein the identification chip is located between the backing layer and the cleaning layer.

24. The cleaning pad of claim 23, wherein the identification chip is sewn into the backing layer and the cleaning layer.

* * * * *